United States Patent
Suzuki et al.

(10) Patent No.: US 7,110,016 B2
(45) Date of Patent: Sep. 19, 2006

(54) OPTICAL SCANNER AND IMAGING APPARATUS USING THE SAME

(75) Inventors: Seizo Suzuki, Kanagawa (JP); Yoshinori Hayashi, Kanagawa (JP); Kazuyuki Shimada, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 11/074,648

(22) Filed: Mar. 9, 2005

(65) Prior Publication Data

US 2005/0151826 A1    Jul. 14, 2005

Related U.S. Application Data

(62) Division of application No. 10/375,036, filed on Feb. 28, 2003, now Pat. No. 6,906,739.

(30) Foreign Application Priority Data

Mar. 1, 2002 (JP) ............................. 2002-055517
Oct. 8, 2002 (JP) ............................. 2002-295220

(51) Int. Cl.
*G02B 26/10* (2006.01)
*B41J 2/447* (2006.01)

(52) U.S. Cl. ...................................... 347/233
(58) Field of Classification Search ................ 347/233, 347/234, 224, 235; 359/204, 205; 358/408
See application file for complete search history.

(56) References Cited

U.S. PATENT DOCUMENTS

| | | |
|---|---|---|
| 6,448,998 B1 | 9/2002 | Suzuki et al. |
| 6,462,853 B1 | 10/2002 | Hayashi |
| 6,509,995 B1 | 1/2003 | Suzuki et al. |
| 6,573,921 B1 | 6/2003 | Hayashi |
| 6,587,245 B1 | 7/2003 | Hayashi |
| 6,596,985 B1 | 7/2003 | Sakai et al. |
| 6,621,512 B1 | 9/2003 | Nakajima et al. |
| 6,657,761 B1 | 12/2003 | Suzuki et al. |
| 6,657,765 B1 | 12/2003 | Hayashi et al. |
| 6,686,946 B1 | 2/2004 | Masuda et al. |
| 6,757,089 B1 | 6/2004 | Hayashi |
| 6,768,506 B1 | 7/2004 | Hayashi et al. |
| 6,771,296 B1 | 8/2004 | Hayashi et al. |
| 6,781,729 B1 | 8/2004 | Suzuki et al. |

(Continued)

FOREIGN PATENT DOCUMENTS

JP    8-313941    11/1996

(Continued)

OTHER PUBLICATIONS

U.S. Appl. No. 11/068,854, filed Mar. 2, 2005, Hayashi.

(Continued)

*Primary Examiner*—Huan Tran
(74) *Attorney, Agent, or Firm*—Oblon, Spivak, McClelland, Maier & Neustadt, P.C.

(57) ABSTRACT

An optical scanner includes a light source modulated based on image data, an optical deflection and scanning part deflecting a light beam emitted from the light source, and a scanning and imaging optical system condensing the deflected light beam toward a scanning surface so as to form a light spot optically scanning the scanning surface. The effective scanning region of the scanning surface is divided into a plurality of regions according to a scanning line curving characteristic. Suitable image data for optically scanning the divided regions are selected from image data of a plurality of image lines every time the light spot optically scans the effective scanning region, so that the image data of each of the image lines is written with scanning line curving being corrected.

2 Claims, 17 Drawing Sheets

U.S. PATENT DOCUMENTS

| | | |
|---|---|---|
| 6,785,028 B1 | 8/2004 | Atsuumi et al. |
| 6,791,729 B1 | 9/2004 | Atsuumi et al. |
| 6,803,941 B1 | 10/2004 | Hayashi et al. |
| 6,813,051 B1 | 11/2004 | Suzuki et al. |
| 6,815,663 B1 | 11/2004 | Ueda |
| 6,822,775 B1 | 11/2004 | Suzuki et al. |
| 6,829,104 B1 | 12/2004 | Suzuki et al. |
| 2002/0080428 A1 | 6/2002 | Suzuki et al. |
| 2002/0100869 A1 | 8/2002 | Hayashi |
| 2002/0122217 A1 | 9/2002 | Nakajima |
| 2002/0131137 A1 | 9/2002 | Suzuki |
| 2002/0171878 A1 | 11/2002 | Nakajima |
| 2003/0025782 A1 | 2/2003 | Amada et al. |
| 2003/0053156 A1 | 3/2003 | Satoh et al. |
| 2004/0090520 A1 | 5/2004 | Sakai et al. |
| 2004/0125193 A1 | 7/2004 | Kubo |
| 2004/0169905 A1 | 9/2004 | Hayashi et al. |
| 2004/0179255 A1 | 9/2004 | Suhara |
| 2005/0018268 A1 | 1/2005 | Hayashi et al. |
| 2005/0024479 A1 | 2/2005 | Itabashi et al. |
| 2005/0045813 A1 | 3/2005 | Suzuki et al. |

FOREIGN PATENT DOCUMENTS

| | | |
|---|---|---|
| JP | 2000-235290 | 8/2000 |
| JP | 2001-215437 | 8/2001 |

OTHER PUBLICATIONS

U.S. Appl. No. 11/074,648, filed Mar. 9, 2005, Suzuki et al.
U.S. Appl. No. 11/213,831, filed Aug. 30, 2005, Hayashi et al.

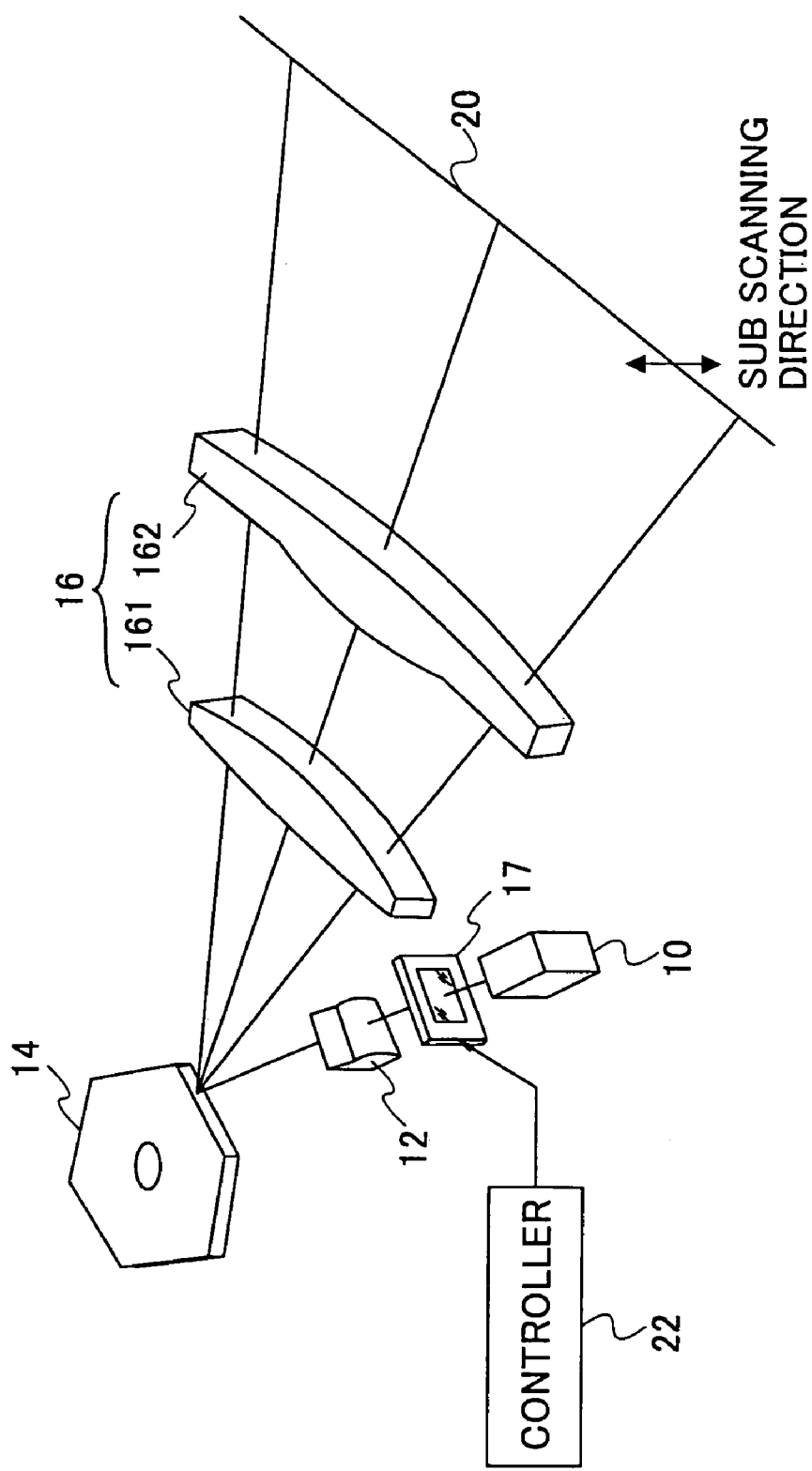

OPTICAL DEFLECTION
AND SCANNING PART

OPTICAL DEFLECTION
AND SCANNING PART

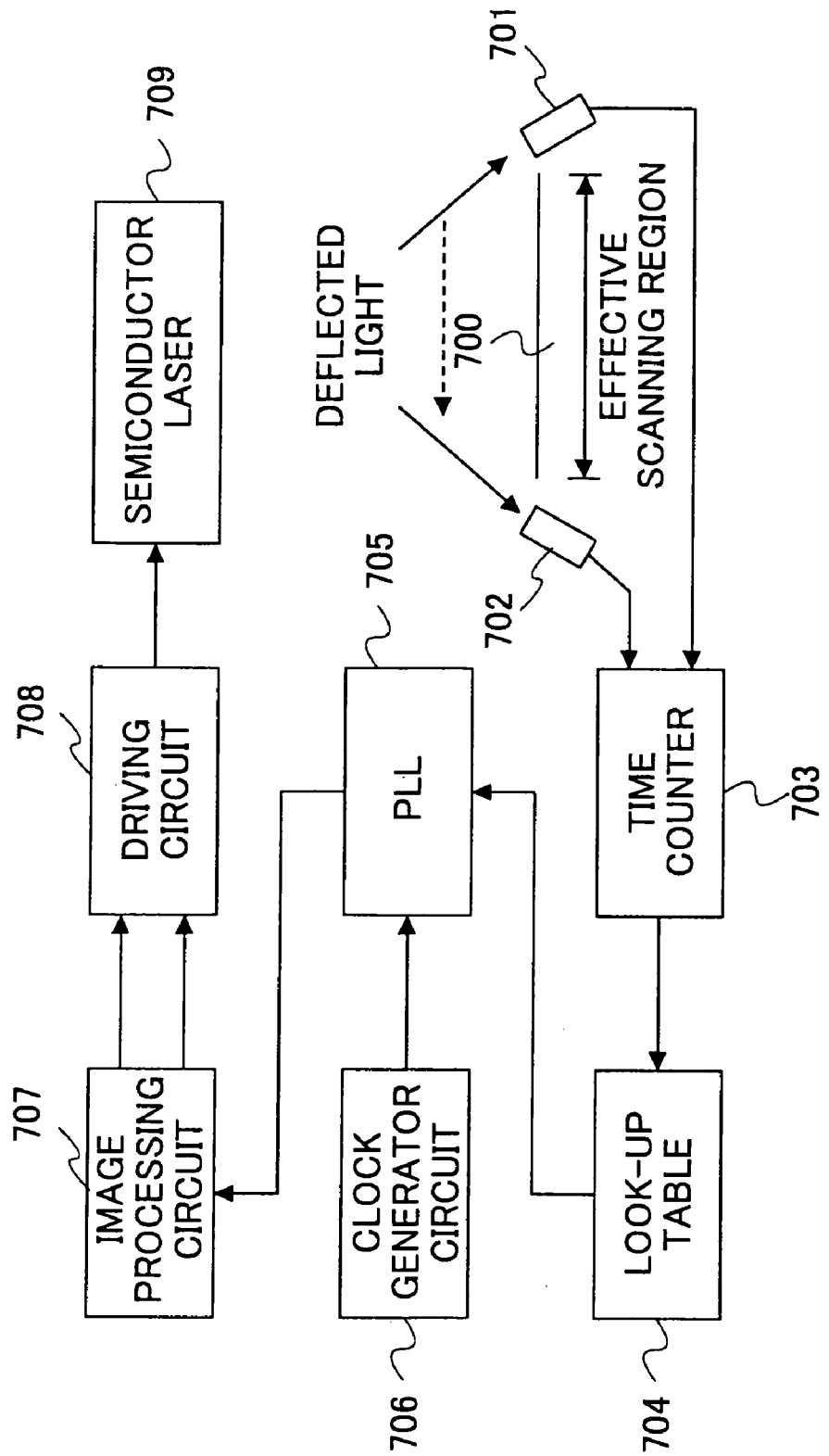

FIG.13
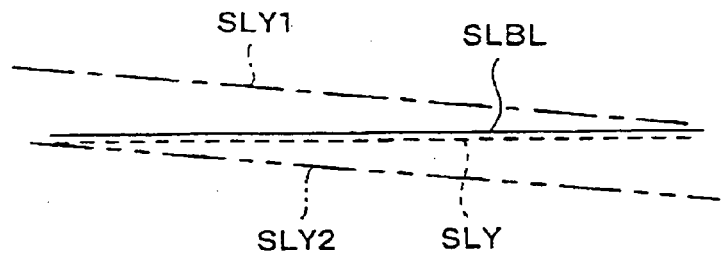
FIG.14A
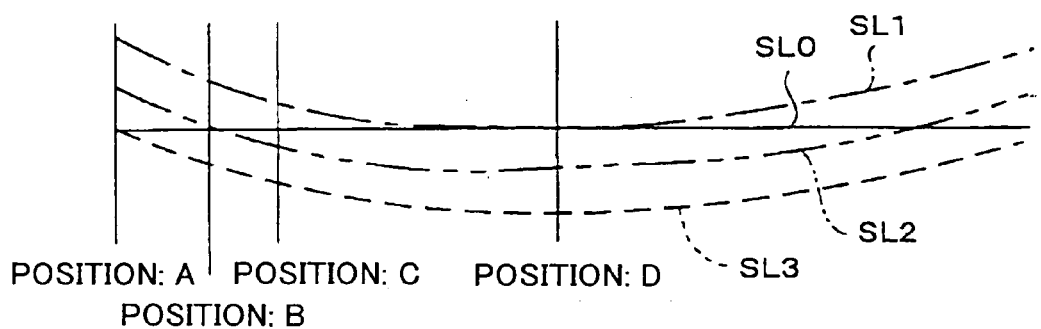
FIG.14B  FIG.14C
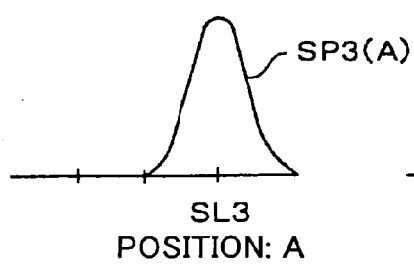 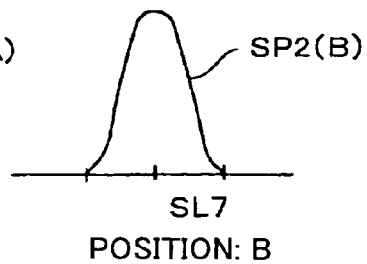
FIG.14D  FIG.14E
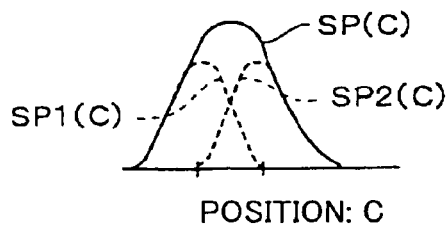 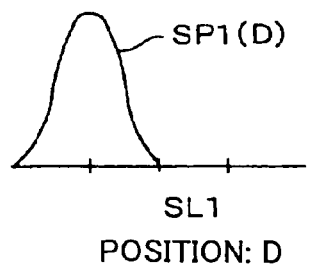

OPTICAL SCANNER AND IMAGING APPARATUS USING THE SAME

BACKGROUND OF THE INVENTION

1. Field of the Invention

The present invention generally relates to optical scanners and imaging apparatuses, and more particularly to an optical scanner that forms a light spot on a scanning surface by using optical deflection and scanning means and a scanning and imaging optical system and optically scans the scanning surface with the light spot, and an imaging apparatus using such an optical scanner.

2. Description of the Related Art

Optical scanners that deflect a light beam emitted from a light source modulated based on image data in a main (primary) scanning direction using optical deflection and scanning means such as a rotary polygonal mirror, focus the deflected light beam into a light spot on a scanning surface (surface to be scanned) using a scanning and imaging optical system such as an fθ lens, and scan the scanning surface with the light spot formed thereon are widely known in relation to imaging apparatuses such as optical printers, optical plotters, and digital copiers.

In an imaging apparatus using such an optical scanner, generally, an imaging process including a step of writing an image by optical scanning is performed. The quality of the formed image depends on the quality of the optical scanning. The optical scanning quality depends on the scanning characteristics of the optical scanner in the main and sub scanning directions.

The scanning characteristics in the main scanning direction include the constant velocity characteristic of optical scanning.

In the case of using a rotary polygonal mirror as optical deflection and scanning means, for instance, a light beam is deflected at a constant angular velocity. Therefore, a scanning and imaging optical system having the fθ characteristic is employed in order to realize the constant velocity characteristic of optical scanning. It is not easy, however, to realize a perfect constant velocity characteristic of optical scanning due to other characteristics required of the scanning and imaging optical system. Therefore, in actual optical scanning, optical scanning is not performed at a perfect constant velocity, so that the constant velocity characteristic as a scanning characteristic is accompanied by "deviation or difference from ideal constant velocity scanning."

The scanning characteristics in the main scanning direction are generated not only by the above-described insufficient correction of the fθ characteristic, but also by: a decrease in the accuracy of optical components or the accuracy of attachment to the housing of the optical scanning system; changes in the optical component properties caused by environmental changes such as changes in temperature and humidity inside the optical scanner; and the shift of a photosensitive body or an intermediate transfer body, which substantially forms the scanning surface, in the direction of its rotation axis.

The scanning characteristics in the sub scanning direction include "scanning line curving" and "scanning line tilting." A scanning line is the trace of movement of a light spot on a scanning surface, and ideally, is a straight line. The optical scanner is designed so as to have a straight scanning line. As it is, however, it is common that the scanning line is curved due to processing or assembly error. This curving of the scanning line is referred to as "scanning line curving," and the degree of curving is referred to as the "scanning line curving characteristic."

In the case of using an "imaging mirror" as a scanning and imaging optical system so as to form an angle in the sub scanning direction between the direction in which the deflected light beam is made incident on the imaging mirror and the direction in which the deflected light beam is reflected therefrom, scanning line curving occurs in principle. In the case of forming the scanning and imaging optical system as a lens system, scanning line curving is unavoidable in multi-beam scanning where the scanning surface is optically scanned by a plurality of light spots separated in the sub scanning direction.

The "scanning line tilting," which is a phenomenon where the scanning line does not cross the sub scanning direction correctly at right angles, is a type of scanning line curving. Accordingly, in the following description, "scanning line tilting" is included in "scanning line curving" unless otherwise indicated.

Imperfection of the constant velocity characteristic of optical scanning distorts a formed image in the main scanning direction, and scanning line curving distorts a formed image in the sub scanning direction. When a single optical scanner writes and forms a monochrome image, the formed image includes no "visually recognizable distortion" if scanning line curving and imperfection of the constant velocity characteristic (or the deviation or difference from the ideal constant velocity scanning) are suppressed to a sufficient extent. However, the image is better with less distortion even if the distortion is visually unrecognizable.

Even in a monochrome image, however, scanning line curving becomes an unignorable problem if image linearity is considered important as in the case of a CAD (computer-aided design) output because even a slight curve of the scanning line significantly degrades the quality of the output image.

Conventionally, in color copiers, images of three colors of magenta, cyan, and yellow or four colors of those three colors plus black are formed as color component images, and a composite color image is formed by superimposing those color component images.

In forming such a color image, a so-called "tandem-type" imaging method is employable. In this imaging method, color component images are formed on different photosensitive bodies by different optical scanners (or different optical scanner parts), respectively. According to this imaging method, however, if the degree of scanning line curving or tilting differs between the optical scanners, an abnormality called "color misregistration" where colors are superimposed inappropriately on top of each other is caused to appear in the formed color image by a slight misalignment of the scanning lines of the optical scanners, thereby degrading the quality of the color image, even if the scanning line curving or tilting is corrected to an acceptable level in each optical scanner.

Further, the "color misregistration" may appear as a phenomenon where a desired tone cannot be obtained in the color image.

In recent years, a special surface, typically, an aspheric surface, has been commonly employed in the imaging optical system of the optical scanners in a bid to improve the scanning characteristics. Accordingly, a low-cost imaging optical system of a resin material, with which such a special surface can be formed easily, is widely used.

When the resin imaging optical system is affected by changes in temperature or humidity, the shape and the refractive index of its element are subject to change. Therefore, the optical properties of the imaging optical system are subject to change. These changes in the optical properties also change the scanning line curving characteristic and the constant velocity characteristic. Then, in the case of successively forming tens of color images, for instance, the imaging apparatus operates continuously to increase its internal temperature, so that the optical properties of the imaging optical system change to gradually change the scanning line curving characteristic and the constant velocity characteristic of each optical scanner. This may cause the phenomenon of color misregistration, thus resulting in a great tone difference between a color image obtained at the beginning and a color image obtained at the end.

Japanese Laid-Open Patent Application No. 2001-215437 discloses a technology of forming an exposure distribution in the sub scanning direction on a scanning surface or in a scanning region. Japanese Laid-Open Patent Application No. 2000-235290 discloses a technology of adjusting a scanning line position in the sub scanning direction by controlling the modulation timing of a light source.

Further, Japanese Laid-Open Patent Application No. 8-313941 discloses a technology relating to a liquid crystal deflection element.

SUMMARY OF THE INVENTION

Accordingly, it is a general object of the present invention to provide an optical scanner and an imaging apparatus in which the above-described disadvantages are eliminated.

A more specific object of the present invention is to provide an optical scanner that effectively corrects scanning line curving so that good optical scanning can be performed.

Another more specific object of the present invention is to provide an optical scanner that suitably corrects, as well as scanning line curving, a deviation of a scanning position in the main scanning direction resulting from the constant velocity characteristic so that better optical scanning can be performed.

Another more specific object of the present invention is to provide an imaging apparatus using any of such optical scanners so that an excellent image can be formed through optical scanning.

Yet another more specific object of the present invention is to correct the deviation, curve, and tilt of a scanning line in one scanning region relative to a corresponding scanning line in another scanning region in the case of scanning a plurality of scanning regions independently of one another.

The above objects of the present invention are achieved by an optical scanner including: a light source modulated based on image data; an optical deflection and scanning part deflecting a light beam emitted from the light source; and a scanning and imaging optical system condensing the deflected light beam toward a scanning surface so as to form a light spot thereon, the light spot optically scanning the scanning surface, wherein an effective scanning region of the scanning surface is divided into a plurality of regions according to a scanning line curving characteristic, and suitable image data for optically scanning the divided regions are selected from image data of a plurality of image lines every time the light spot optically scans the effective scanning region, so that the image data of each of the image lines is written with scanning line curving being corrected.

The above objects of the present invention are also achieved by an optical scanner including: a light source modulated based on image data to emit a plurality of light beams; an optical deflection and scanning part deflecting the light beams; and a scanning and imaging optical system condensing the deflected light beams toward a scanning surface so that light spots are formed on the scanning surface so as to be separated from each other in a sub scanning direction, the light spots having substantially equal scanning line curving characteristics and optically scanning the scanning surface simultaneously, wherein an effective scanning region of the scanning surface is divided into a plurality of regions according to the scanning line curving characteristics, and a suitable one of the light beams is selected for optical scanning in each of the divided regions with respect to each of image lines every time the light spots optically scan the effective scanning region simultaneously, so that the image data of each of the image lines is written with scanning line curving being corrected.

The above objects of the present invention are also achieved by an imaging apparatus including: N ($\geq 2$) photoconductive photosensitive bodies arranged along a path for conveying a sheet-like recording medium; and N optical scanners optically scanning the N photosensitive bodies, respectively, so as to write and form different electrostatic latent images thereon, the electrostatic latent images being made visible as toner images of different colors so that the toner images are transferred to and fixed on the sheet-like recording medium, being superimposed one over another, wherein one of the N photosensitive bodies has a black toner image formed thereon, and each of the optical scanners for the remaining N-1 photosensitive bodies includes: a light source modulated based on image data; an optical deflection and scanning part deflecting a light beam emitted from the light source; and a scanning and imaging optical system condensing the deflected light beam toward a scanning surface of the corresponding photosensitive body so as to form a light spot on the scanning surface, the light spot optically scanning the scanning surface, an effective scanning region of the scanning surface being divided into a plurality of regions according to a scanning line curving characteristic, and suitable image data for optically scanning the divided regions being selected from image data of a plurality of image lines every time the light spot optically scans the effective scanning region, so that the image data of each of the image lines is written with scanning line curving being corrected based on the black toner image.

The above objects of the present invention are also achieved by an imaging apparatus including: N ($\geq 2$) photoconductive photosensitive bodies arranged along a path for conveying a sheet-like recording medium; and N optical scanners optically scanning the N photosensitive bodies, respectively, so as to write and form different electrostatic latent images thereon, the electrostatic latent images being made visible as toner images of different colors so that the toner images are transferred to and fixed on the sheet-like recording medium, being superimposed one over another, wherein one of the N photosensitive bodies has a black toner image formed thereon, and each of the optical scanners for the remaining N-1 photosensitive bodies includes: a light source modulated based on image data to emit a plurality of light beams; an optical deflection and scanning part deflecting the light beams; and a scanning and imaging optical system condensing the deflected light beams toward a scanning surface of the corresponding photosensitive body so that light spots are formed on the scanning surface so as to be separated from each other in a sub scanning direction, the light spots having substantially equal scanning line curving characteristics and optically scanning the scanning surface simultaneously, an effective scanning region of the scanning surface being divided into a plurality of regions according to the scanning line curving characteristics, and a suitable one of the light beams being selected for optical scanning in each of the divided regions with respect to each of image lines every time the light spots optically scan the effective scanning region simultaneously, so that the image data of each of the image lines is written with scanning line curving being corrected based on the black toner image.

The above objects of the present invention are also achieved by an optical scanner including a plurality of optical scanning parts optically scanning a plurality of scanning regions, respectively, so as to write images to form a desired image separately in the scanning regions, the optical scanning parts each deflecting a light beam emitted from a modulated light source by an optical deflection and scanning part so that the deflected light beam is guided by a scanning and imaging optical system to form a light spot in the corresponding scanning region, the light spot optically scanning the corresponding scanning region, wherein, in at least one of the scanning regions, an exposure distribution is formed to have a center of gravity between scanning lines adjacent in a sub scanning direction so that a position of the center of gravity in the sub scanning direction is shiftable.

The above objects of the present invention are also achieved by an imaging apparatus including: a plurality of photoconductive photosensitive bodies as scanning regions; and an optical scanner optically scanning the scanning regions so as to form electrostatic latent images therein, the electrostatic latent images being made visible with toners of different colors as toner images, the toner images being transferred to a sheet-like recording medium superimposed one over another so as to form a desired image, wherein the optical scanner includes a plurality of optical scanning parts optically scanning the scanning regions, respectively, so as to write the electrostatic latent images to form the desired image separately in the scanning regions, the optical scanning parts each deflecting a light beam emitted from a modulated light source by an optical deflection and scanning part so that the deflected light beam is guided by a scanning and imaging optical system to form a light spot in the corresponding scanning region, the light spot optically scanning the corresponding scanning region, and an exposure distribution is formed to have a center of gravity between scanning lines adjacent in a sub scanning direction in at least one of the scanning regions so that a position of the center of gravity in the sub scanning direction is shiftable.

The above objects of the present invention are also achieved by an optical scanner including an optical scanning part optically scanning a scanning region so as to write a desired image therein, the optical scanning part deflecting a light beam emitted from a modulated light source by an optical deflection and scanning part so that the deflected light beam is guided by a scanning and imaging optical system to form a light spot in the scanning region, the light spot optically scanning the scanning region, wherein an exposure distribution is formed to have a center of gravity between scanning lines adjacent in a sub scanning direction in the scanning region so that a position of the center of gravity in the sub scanning direction is shiftable.

The above objects of the present invention are further achieved by an imaging apparatus including: a photoconductive photosensitive body as a scanning region; and an optical scanner optically scanning the scanning region so as to form an electrostatic latent image therein, the electrostatic latent image being made visible with toner as a toner image, the toner image being transferred to a sheet-like recording medium so as to form a desired image, wherein the optical scanner includes an optical scanning part optically scanning the scanning region so as to write the desired image therein, the optical scanning part deflecting a light beam emitted from a modulated light source by an optical deflection and scanning part so that the deflected light beam is guided by a scanning and imaging optical system to form a light spot in the scanning region, the light spot optically scanning the scanning region, and an exposure distribution is formed to have a center of gravity between scanning lines adjacent in a sub scanning direction in the scanning region so that a position of the center of gravity in the sub scanning direction is shiftable.

BRIEF DESCRIPTION OF THE DRAWINGS

Other objects, features and advantages of the present invention will become more apparent from the following detailed description when read in conjunction with the accompanying drawings, in which:

FIGS. 5A and 5B are diagrams showing optical scanners performing correction for fine adjustment according to the first embodiment of the present invention;

FIGS. 7A and 7B are diagrams for illustrating adjustment of the position of a light spot in the main scanning direction according to the first embodiment of the present invention;

FIG. 13 is a diagram for illustrating correction of scanning line tilting by the optical scanner according to the fourth embodiment of the present invention;

FIGS. 14A through 14E are diagrams for illustrating correction of scanning line curving using three or more light spots according to the fourth embodiment of the present invention;

DETAILED DESCRIPTION OF THE PREFERRED EMBODIMENTS

Figure 1:
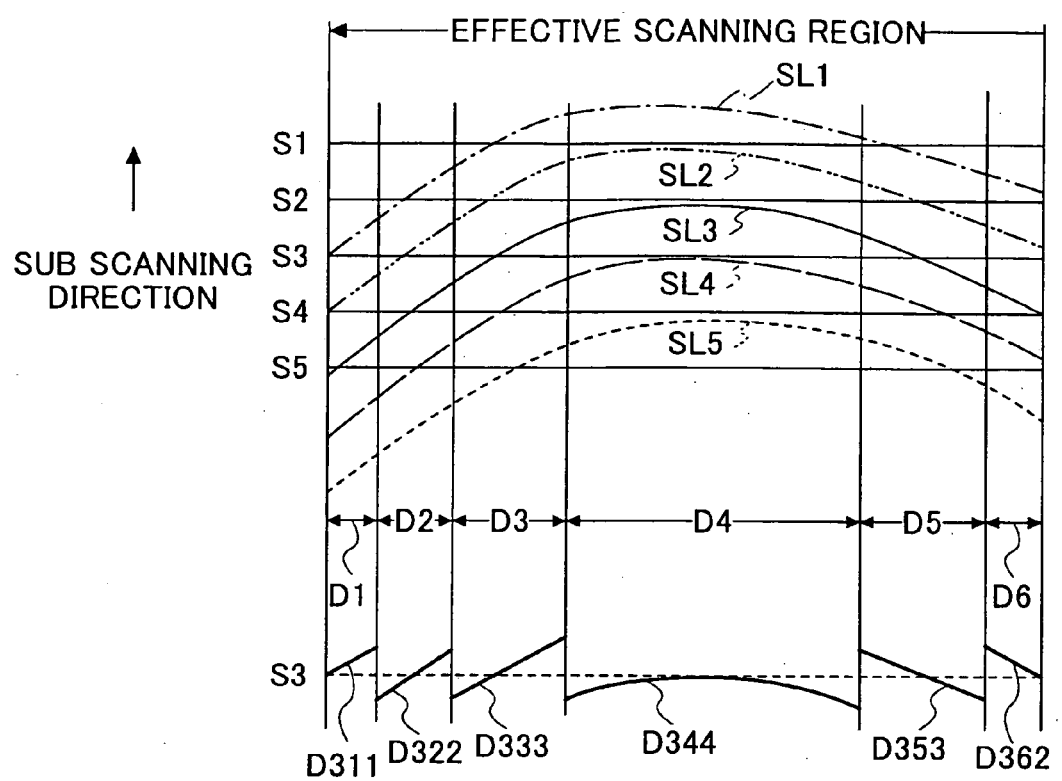
FIG. 1 is a diagram for illustrating a divided writing method according to the present invention.

A description will now be given, with reference to the accompanying drawings, of embodiments of the present invention.

First, a description will be given of the definitions of the following terms employed in the following description.

"Image data" refers to a group of pixel data for an image to be formed by optical scanning. The intensity of a light beam emitted from a light source is modulated in accordance with the image data, so that the image is written to the positions corresponding to the pixels on a scanning surface. The image data may be obtained by reading a document to be duplicated and converting the document into pixel data. Alternatively, the image data may be generated in a computer, a word processor, a digital camera, or an information terminal device. Further, the image data may be transferred as external data.

A "deflection and scanning part" deflects a light beam from a light source in the main scanning direction for optical scanning. A conventional well-known mirror such as a polygon mirror, a pyramidal mirror, a rotary single-surface mirror such as a tenon-shaped mirror, a rotary dual-surface mirror, or a galvano mirror may be used as the deflection and scanning part.

A "scanning and imaging optical system" condenses a light beam deflected by the deflection and scanning part toward a scanning surface and forms a light spot thereon. The scanning and imaging optical system may be formed as a lens system such as an fθ lens, an imaging mirror system such as an fθ mirror, or a combination of a lens system and a mirror system.

The scanning and imaging optical system may include a resin imaging element. In this case, the scanning and imaging optical system may be formed partly of resin imaging elements, or the entire scanning and imaging optical system may be formed of resin imaging elements. The entire scanning and imaging optical system may be formed of a single resin imaging element.

The scanning and imaging optical system may have the function of making constant the velocity of optical scanning by a light spot. When the optical deflection and scanning part deflects a light beam at constant angular velocity, for instance, a scanning and imaging optical system having the fθ function for causing the light spot to perform optical scanning at constant velocity is employed. In this case, the fθ characteristic is the constant velocity characteristic of optical scanning.

A "scanning surface" refers to a surface optically scanned by a light spot. Generally, the scanning surface is substantially a photosensitive body.

A variety of "photosensitive media" may be used. A silver film, for instance, may be used as a photosensitive medium. In this case, a latent image formed by writing by optical scanning may be made visible by a normal silver photography process. An imaging apparatus using such a photosensitive medium may be realized as an optical plate-making device or an optical drawing device that draws a CT scan image.

A color-developing medium that develops color due to the thermal energy of a light spot at the time of optical scanning may also be employed as a photosensitive medium. In this case, a visible image can be formed directly by optical scanning.

Further, a photoconductive photosensitive body is also employable as a photosensitive medium. The photoconductive photosensitive body may have a sheet-like shape as zinc oxide paper. The photoconductive photosensitive body may have a drum-like or belt-like shape and be repeatedly used as a selenium photosensitive body or an organic photo conductor.

An "effective scanning region" refers to a region in the main scanning direction on the scanning surface optically scanned by a light spot in which region the image data is effectively written.

An "image line" refers to an ideal straight line forming one line of an image. A series of data forming the image of the image line is written to the image line.

First Embodiment

FIG. 1 is a diagram for illustrating a divided writing method according to the present invention. According to the divided writing method, when one light spot performs optical scanning moving on a scanning surface, in each predetermined part of a scanning line, which is the trace of movement of the light spot, image data for the image line (corresponding to an ideal straight scanning line) closest to the predetermined part is written. That is, every time a light spot optically scans a scanning surface, image data for a plurality of image lines are selected. Thus, each of the image lines is partially written by each optical scan. Accordingly, the image data of each entire image line are written by a plurality of optical scans by the light spot. According to this method, image data for a plurality of image lines are divided and written during a single optical scan by a light spot. Further, image data forming one image line is written by a plurality of optical scans by the light spot. Therefore, this method is referred to as the divided writing method. FIG. 1 shows a scanning surface (surface to be scanned) on which optical scanning is performed. In FIG. 1, the upward direction is the sub scanning direction. That is, as optical scanning is repeated in the main scanning direction, a photosensitive medium substantially forming the scanning surface moves in the upward direction of FIG. 1. In the following description, the sub scanning direction may also include the downward direction in FIG. 1, that is, the direction opposite to the direction in which the photosensitive medium moves.

In FIG. 1, the reference numerals S1 through S5 denote five "image lines" spaced in the sub scanning direction. The image lines correspond to ideal straight scanning lines. The reference numerals SL1 through SL5 denote virtual scanning lines that are formed on the scanning surface by five optical scans successively performed by a single light spot. That is, the light spot performs the optical scans in the order of SL1, SL2, SL3, SL4, and SL5.

As previously described, an ideal scanning line is straight. If an ideal straight scanning line could be formed, optical scanning in which each scanning line matches its corresponding image line would be realized. As it is, however, "scanning line curving" occurs in the actual optical scanning as previously described.

In the divided writing method, the effective scanning region is divided into a plurality of regions Di (i=1, 2, ... ) as shown in FIG. 1. In the case of FIG. 1, the effective scanning region is divided into six regions D1 through D6. Division of the effective scanning region is determined based on the scanning line curving characteristic, that is, the degree of scanning line curving.

In the case of the scanning line SL3, for instance, as optical scanning proceeds from the starting side (from left to right in the drawing), the scanning line SL3 comes closest to: the image line S5 in the region D1; the image line S4 in the region D2; the image line S3 in the region D3; the image line S2 in the region D4; the image line S3 in the region D5; and the image line S4 in the region D6.

Accordingly, as the light spot performs writing along the scanning line SL3, the light spot writes image data for: the image line S5 in the region D1; the image line S4 in the region D2; the image line S3 in the region D3; the image line S2 in the region D4; the image line S3 in the region D5; and the image line S4 in the region D6.

That is, the image data is marked with the number k of the image line Sk, the number i of the region Di on which writing is to be performed, and the number j of the scanning line SLj to write data for the region Di. Accordingly, the image data to be written in the region Di of the image line Sk by the scanning line SLj is indicated as $D_{kij}$. As a specific example, the above-described case of optical scanning by the scanning line SL3 is considered herein. The index j specifying the scanning line is set to "3." The image line number k is set to 1 through 5 so as to correspond to the image lines S1 through S5.

When the light spot performs optical scanning along the scanning line SL3 as previously described, for instance, the light intensity of the light spot drawing the scanning line SL3 is modulated by: image data $D_{513}$ in the region D1; image data $D_{423}$ in the region D2; image data $D_{333}$ in the region D3; image data $D_{243}$ in the region D4; image data $D_{353}$ in the region D5; and image data $D_{463}$ in the region D6.

FIG. 1 shows, in its lower part, a written image equivalent to one image line, whose image data is written, so as to correspond to the image line S3, by optical scanning in which scanning line curving is corrected. In each of the regions D1 through D5, this image is written by the corresponding one of the scanning lines SL1 through SL4.

That is, the image data for writing the image line S3 is divided into: image data $D_{311}$ in the region D1; image data $D_{322}$ in the region D2; the image data $D_{333}$ in the region D3; image data $D_{344}$ in the region D4; the image data $D_{353}$ in the region D5; and image data $D_{362}$ in the region D6. Thus, the image data is written by: the scanning line SL1 in the region D1; the scanning line SL2 in the region D2; the scanning line SL3 in the region D3; the scanning line SL4 in the region D4; the scanning line SL3 in the region D5; and the scanning line SL2 in the region D6.

The written image corresponding to the image line S3 shown in the lower part of FIG. 1, which image is formed by writing a straight line in the main scanning direction according to the above-described divided writing method, shows discontinuity and "variation" over the divided regions D1 through D6. However, the image only varies within the range corresponding to the interval between the adjacent image lines, that is, the interval between the image lines SL2 and SL3 or the image lines SL3 and SL4. This interval is referred to as one scanning line interval. Therefore, FIG. 1 shows that the written image is effectively corrected to have reduced distortion compared with the case where an image is written continuously along one scanning line, that is, the scanning line SL3. In such a case, the written image curves along the scanning line SL3 so as to vary over four scanning line intervals of FIG. 1.

If the maximum value of scanning line curving is 0.5 mm for an effective scanning region width of 290 mm, the magnitude of variation of the written image shown in the lower part of FIG. 1 is at most a little over 0.1 mm in each of the regions D1 through D6. Therefore, it is apparent that scanning line curving is effectively reduced. On a scale of this magnitude, the variation of the image does not pose any problem.

As previously described, according to the divided writing method, the effective scanning region is divided into the regions Di (i=1, 2, . . . ) in accordance with the scanning line curving characteristic. Further, in each optical scan, one of the image data for a plurality of image lines which one is suitable for the optical scan is selected in each of the regions Di. Thereby, the image data for each image line is written with the corrected scanning line curving.

Figure 2A:
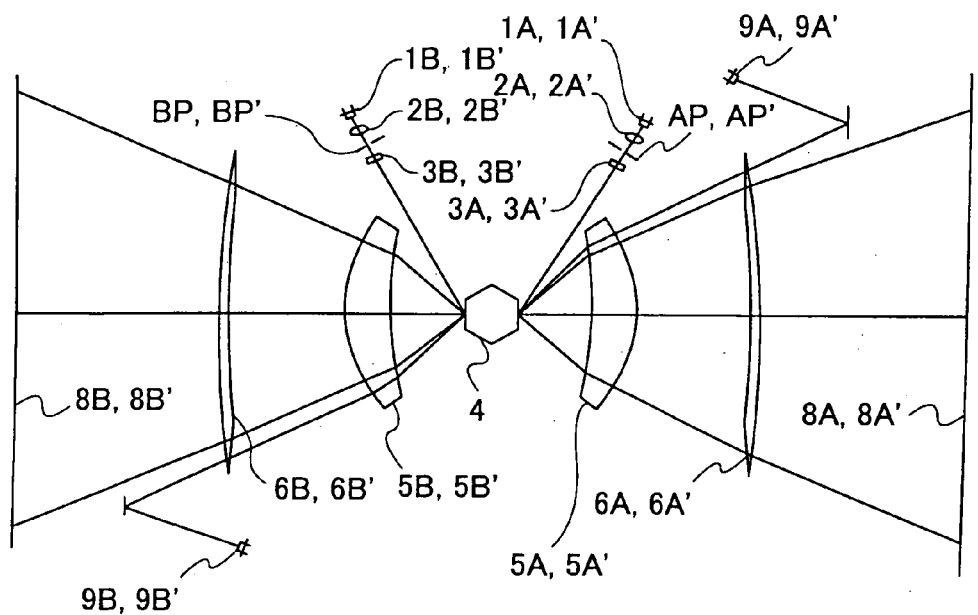
FIGS. 2A and 2B are diagrams for illustrating an imaging apparatus according to a first embodiment of the present invention.
Figure 2B:
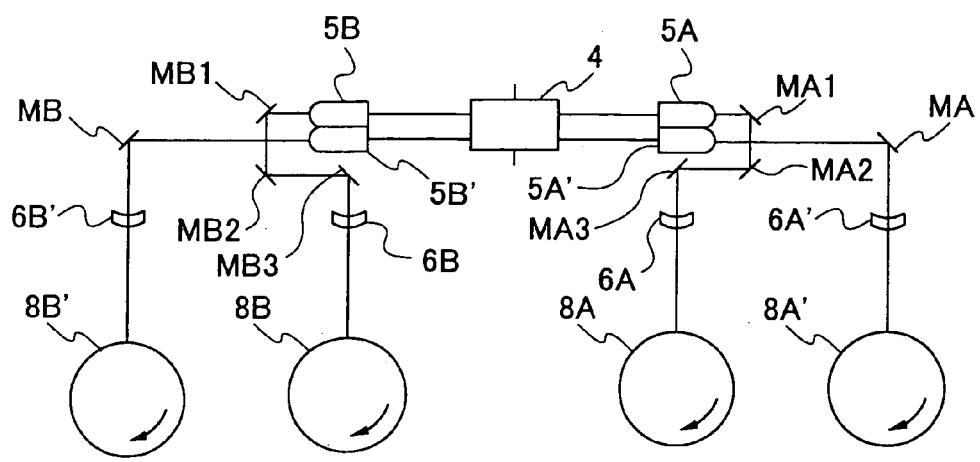

FIGS. 2A and 2B are diagrams for illustrating an imaging apparatus according to a first embodiment of the present invention.

As shown in FIG. 2B, this imaging apparatus is a color-image forming apparatus of a tandem type. The imaging apparatus includes four photoconductive photosensitive bodies 8A', 8A, 8B, and 8B' arranged in the order described along a conveyance path for conveying a sheet-like recording medium (not shown in the drawings) from right to left in FIG. 2B. The four photosensitive bodies 8A', 8A, 8B, and 8B' form substantial scanning surfaces, and are subjected to optical scanning individually. The sheet-like recording medium may be transfer paper or an OHP sheet (a plastic sheet for overhead projectors), for instance.

As shown in FIGS. 2A and 2B, the optical scanner of the imaging apparatus has superimposed optical systems in the axial direction of a polygon mirror 4 between light sources and scanning and imaging optical systems. The polygon mirror 4 is a rotary polygonal mirror serving as an optical deflection and scanning part.

As shown in FIG. 2A, in the superimposed optical systems of the optical scanner, a light beam emitted from a light source 1A, which is a semiconductor laser, is coupled by a coupling lens 2A to be converted into a parallel light beam or a weak divergent or convergent light beam. Then, the light beam is beam-shaped by passing through an aperture AP for beam shaping. Thereafter, the light beam is transmitted through a cylindrical lens 3A that is a line-image forming optical system to be condensed in the sub scanning direction. Then, the light beam is focused approximately (or exactly) on a deflecting and reflecting surface of the polygon mirror 4 as a line image extending along the main scanning direction.

A light beam emitted from a light source 1A' (semiconductor laser) superimposed on the above-described optical system is coupled by a coupling lens 2A' to be converted into a parallel light beam or a weak divergent or convergent light beam. Then, the light beam is beam-shaped by passing through an aperture AP' for beam shaping. Thereafter, the light beam is transmitted through a cylindrical lens 3A' that is a line-image forming optical system to be condensed in the sub scanning direction. Then, the light beam is focused approximately on a deflecting and reflecting surface of the polygon mirror 4 as a line image extending along the main scanning direction. The line image formed by the light beam emitted from the light source 1A' is separated from that formed by the light beam emitted from the light source 1A in the axial direction of the polygon mirror 4 or in the sub scanning direction.

Light sources 1B and 1B' that are semiconductor lasers, coupling lenses 2B and 2B', apertures BP and BP', and cylindrical lenses 3B and 3B' are also superimposed, respectively, in the sub scanning direction or in the axial direction of the polygon mirror 4.

A light beam emitted from a light source 1B (1B') is coupled by a coupling lens 2B (2B') to be converted into a parallel light beam or a weak divergent or convergent light beam. Then, the light beam is beam-shaped by passing through an aperture BP (BP') for beam shaping. Thereafter, the light beam is transmitted through a cylindrical lens 3A (3A') that is a line-image forming optical system to be condensed in the sub scanning direction. Then, the light beam is focused approximately on a deflecting and reflecting surface of the polygon mirror 4 as a line image extending along the main scanning direction. The line images into which the light beams emitted from the light source 1B and 1B' are formed, respectively, are also separated from each other in the sub scanning direction.

As shown in FIG. 2B, the polygon mirror 4 has deflecting and reflecting surfaces wide in the direction of its rotation axis so as to be capable of simultaneously deflecting the four light beams for scanning.

The light beam emitted from the light source 1A is deflected by the polygon mirror 4 to pass through a lens 5A. Then, the light beam is reflected by mirrors MA1, MA2, and MA3 for optical path bending, and passes through a lens 6A to be guided to the photoconductive photosensitive body 8A. The light beam is focused into a light spot (beam spot) on the photosensitive body 8A through the action of the lenses 5A and 6A forming an fθ lens, and optically scans the photosensitive body 8A.

The light beam emitted from the light source 1A' is deflected by the polygon mirror 4 to pass through a lens 5A'. Then, the light beam is reflected by a mirror MA for optical path bending, and passes through a lens 6A' to be guided to the photoconductive photosensitive body 8A'. The light beam is focused into a light spot (beam spot) on the photosensitive body 8A' through the action of the lenses 5A' and 6A' forming an fθ lens, and optically scans the photosensitive body 8A'.

The light beam emitted from the light source 1B is deflected by the polygon mirror 4 to pass through a lens 5B. Then, the light beam is reflected by mirrors MB1, MB2, and MB3 for optical path bending, and passes through a lens 6B to be guided onto the photoconductive photosensitive body 8B. The light beam is focused into a light spot (beam spot) on the photosensitive body 8B through the action of the lenses 5B and 6B forming an fθ lens, and optically scans the photosensitive body 8B.

The light beam emitted from the light source 1B' is deflected by the polygon mirror 4 to pass through a lens 5B'. Then, the light beam is reflected by a mirror MB for optical path bending, and passes through a lens 6B' to be guided to the photoconductive photosensitive body 8B'. The light beam is focused into a light spot (beam spot) on the photosensitive body 8B' through the action of the lenses 5B' and 6B' forming an fθ lens, and optically scans the photosensitive body 8B'.

For instance, electrostatic latent images corresponding to yellow, magenta, cyan, and black images are written to and formed on the photosensitive bodies 8A', 8A, 8B, and 8B', respectively. Then, the latent images are made visible with their corresponding color toners so as to be formed into a yellow toner image, a magenta toner image, a cyan toner image, and a black toner image, respectively. These color images are transferred to the sheet-like recording medium, positioned relative to one another and superimposed one over the other. After fixing the transferred color images, a composite color image is obtained.

At this point, application of image data modulating the light emission intensity of each of the light sources 1A, 1A', 1B and 1B' is controlled by a control part such as a computer (not shown in the drawings), and the "divided writing method" is performed as described above with reference to FIG. 1. Thereby, scanning line curving is effectively corrected in each of the images written to the photosensitive bodies 8A, 8A', 8B, and 8B'. Therefore, the above-described problem of color misregistration due to scanning line curving can be effectively reduced.

According to the optical scanner shown in FIGS. 2A and 2B to which the divided writing method of FIG. 1 is applied, the light beams emitted from the light sources 1A, 1A', 1B, and 1B' are deflected in the main scanning direction by the optical deflection and scanning part 4 to be condensed toward the scanning surfaces 8A, 8A', 8B, and 8B' by the scanning and imaging optical systems 5A and 6A, 5A' and 6A', 5B and 6B, and 5B' and 6B', respectively. Thereby, the light spots are formed on the scanning surfaces 8A, 8A', 8B, and 8B', so that the optical scanner optically scans the scanning surfaces 8A, 8A' 8B, and 8B' with the light spots. The effective scanning region of each of the scanning surfaces 8A, 8A', 8B, and 8B' is divided into the regions Di (i=1, 2, . . . ) in accordance with the scanning line curving characteristic. In each optical scan, one of the image data for a plurality of image lines which one is suitable for the optical scan is selected in each of the regions Di. Thereby, the image data for each image line is written with corrected scanning line curving.

According to the above-described optical scanner, scanning line curving is effectively corrected as described above. This correction is not always perfect, however, as shown in the written image for the image line 3 shown in the lower part of FIG. 1. Therefore, further correction for fine adjustment is required.

Next, a description will be given of this correction for fine adjustment according to the first embodiment of the present invention.

According to a method of correction for fine adjustment according to the first embodiment of the present invention, a plurality of light beams are emitted from a light source so that two or more light spots are formed close to each other in the sub scanning direction on a scanning surface. The "center of gravity (CG)" position in the composite light intensity distribution obtained by superimposing the light intensity distributions of the light beams in the sub scanning direction is varied or shifted by adjusting the intensity of each of the light beams. Thereby, scanning line curving that is included in one image line but is not completely correctable by the divided writing method is finely adjusted to be corrected.

Figure 3A:
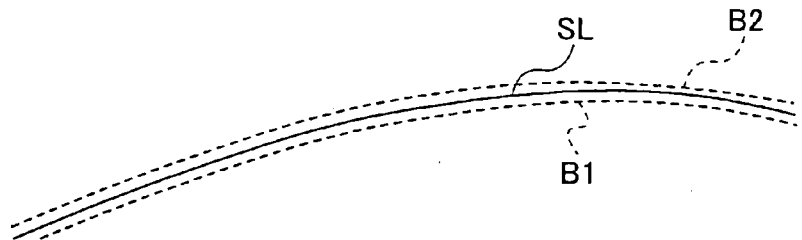
FIGS. 3A through 3D are diagrams for illustrating a method of correction for fine adjustment according to the first embodiment of the present invention.
Figure 3B:
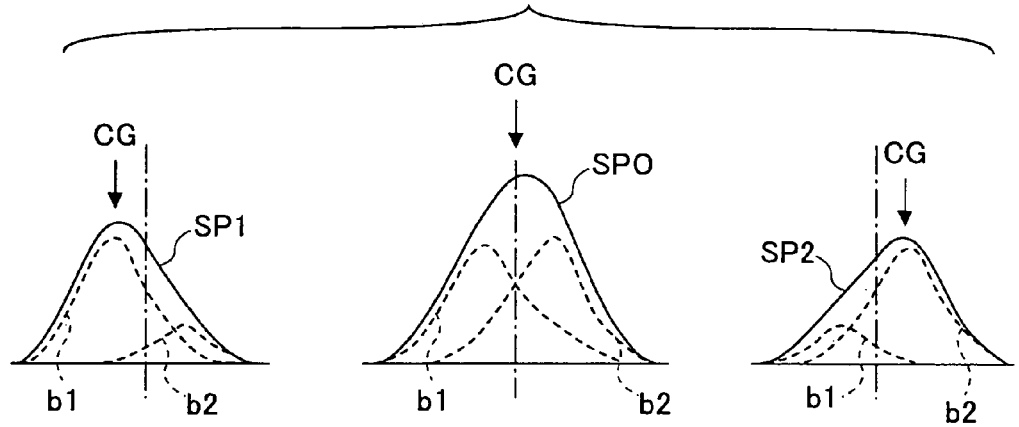

FIGS. 3A through 3B are diagrams for illustrating the method of correction for fine adjustment according to the first embodiment of the present invention.

In FIG. 3A, reference numerals B1 and B2 denote the traces of movement of two light spots b1 and b2 that are formed on a scanning surface by two light beams emitted from a light source. The traces of movement of the two light spots are close to each other in the sub scanning direction.

The light intensity distributions of the light spots b1 and b2 on the scanning surface view from the main scanning direction are shown in (b) of FIG. 3B. The left-to-right direction of FIG. 3B corresponds to the sub scanning direction. As shown in (b) of FIG. 3B, when the light intensity distributions of the light spots b1 and b2 are equal to each other, the light spots b1 and b2 close to each other in the sub scanning direction are combined into a composite light intensity distribution SP0 indicated by the solid line in (b) of FIG. 3B.

The above-mentioned center of gravity position in a composite light intensity distribution obtained by superimposing the light intensity distributions of the light beams in the sub scanning direction corresponds to a maximum intensity position in the sub scanning direction in the composite light intensity distribution SP0 in the case of (b) of FIG. 3B.

When the light intensity distributions of the light spots b1 and b2 are set to be equal to each other during optical scanning, the two light spots b1 and b2 draw the traces of movement B1 and B2, respectively, so that the composite light intensity distribution SP0 draws a trace SL indicated by the solid line in FIG. 3A. Since the scanning surface is substantially scanned by the composite light intensity distribution SP0, a scanning line on the scanned surface matches the trace SL.

FIG. 3B(a) shows the case where the light intensities of the light spots b1 and b2 are imbalanced so that the light intensity of the light spot 2 is lower than that of the light spot b1. In this case, the center of gravity position of a composite light intensity distribution SP1 shifts to the left as shown in (a) of FIG. 3B. FIG. 3B(c) shows the case where the light intensities of the light spots b1 and b2 are imbalanced so that the light intensity of the light spot b1 is lower than that of the light spot b2. In this case, the center of gravity position of a composite light intensity distribution SP2 shifts to the right as shown in (c) of FIG. 3B.

Accordingly, when optical scanning is performed with the composite light intensity distribution SP1, the scanning line SL approaches the trace B1 on the scanning surface in FIG. 3A. On the other hand, when optical scanning is performed with the composite light intensity distribution SP2, the scanning line SL approaches the trace B2 on the scanning surface in FIG. 3A.

That is, by adjusting the magnitudes of the light intensity distributions of the light spots b1 and b2 relative to each other, the center of gravity position in the composite light intensity distribution (the position of the center of a composite light spot optically scanning the scanning surface) can be shifted along the sub scanning direction.

Figure 3C:
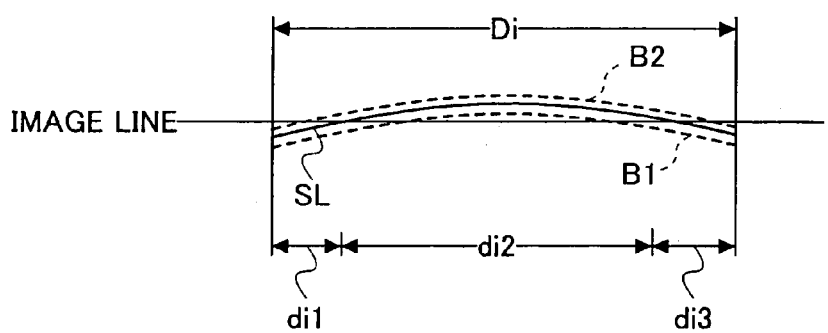
Figure 3D:
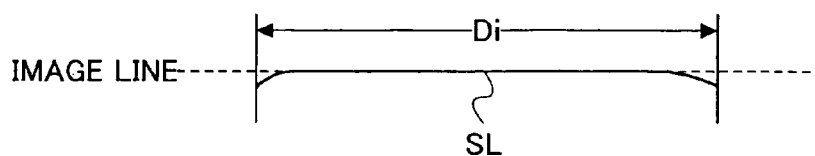

For instance, when the scanning line SL is formed as shown in FIG. 3C in a certain scanning region Di as a result of correcting scanning line curving by the above-described divided writing method, the light intensity of the light spot b2 is set to be higher than that of the light spot b1 in the section di1 of the region Di, the light intensity of the light spot b1 is set to be higher than that of the light spot b2 in the section di2 of the region Di, and the light intensity of the light spot b2 is set to be higher than that of the light spot b1 in the section di3 of the region Di. Thereby, the center of gravity of the composite light intensity distribution approaches the image line, so that the scanning line SL, which is the trace of the center of gravity of the composite light intensity distribution, can substantially match the image line very well as shown in FIG. 3D.

In the divided writing method, the scanning line can better match the image line also in another divided region Dj. Thus, scanning line curving that is not completely correctable by the divided writing method is subjected to further correction for fine adjustment. Thereby, an excellent scanning line can be realized.

In the above description, the light spots b1 and b2 are aligned in the sub scanning direction. Actually, however, the light spots b1 and b2 are not necessarily required to be aligned completely in the sub scanning direction. The light spots b1 and b2 may be offset relative to each other in the main scanning direction. There may be a slight difference in timing between exposure by the light spot b1 and exposure by the light spot b2 such that the difference does not exert great influence on the composite exposure distribution. That is, exposure of a photosensitive medium forming a substantial scanning surface is the scalar sum of the light intensities of the light spots b1 and b2, so that the light spots b1 and b2 are not necessarily required to expose the photosensitive body to light simultaneously. Further, the light spots b1 and b2 can be formed with different timings by successive optical scans by the same light beam.

In the above-described case, the two light spots b1 and b2 are employed. The scanning line, however, can be formed of the composite light intensity distribution of three or more light spots. In this case, by adjusting the light intensity distributions of the light spots relative to each other, correction can be performed with finer adjustment.

In the case of thus performing correction for fine adjustment on scanning line curving by shifting the center of gravity of the composite light intensity distributions of a plurality of light spots, in order to prevent the light spots from being separated from each other and thus degrading resolution in the sub scanning direction, it is preferable that the diameter Ws in the sub scanning direction of a stationary light spot on the scanning surface and the distance L between the scanning traces of adjacent light spots satisfy the following expression, Ws and L being defined by the maximum intensity $1/e^2$ of the light intensity distribution of each light spot:

$$1.2 < Ws/L < 4.5$$

When the parameter Ws/L is smaller than or equal to the lower limit-value 1.2, the overlap of the adjacent light spots is reduced, so that the composite light intensity distribution of the light spots is prevented from having a "single-peaked shape," thus making it difficult to perform optical scanning by the composite light intensity distribution. On the other hand, when the parameter Ws/L is larger than or equal to the upper limit value 4.5, the composite light intensity distribution is reduced in width in the sub scanning direction so as to narrow the shift range of the center of gravity of the composite light intensity distribution. This makes it difficult to perform effective correction. for fine adjustment.

In the case of performing this method of correction for fine adjustment in the imaging apparatus shown in FIGS. 2A and 2B, each light source employs, as a light emitting source, a monolithic semiconductor laser array of two or more semiconductor laser light emitting parts arranged in an array. The light beams emitted from the semiconductor laser light emitting parts are formed into a plurality of light spots close to each other in the sub scanning direction on the scanning surface, and the intensity of each of the light beams emitted from the semiconductor laser light emitting parts is modulated.

There is another method of performing further correction for fine adjustment on scanning line curving corrected by the divided writing method.

According to this method, by using a deflection part that can deflect a light beam emitted from a light source in the sub scanning direction, a light spot position on the scanning surface is displaced in the sub scanning direction by deflecting the light beam with the deflection part, thereby finely adjusting and correcting scanning line curving included in one scanning line but not completely correctable by the divided writing method.

As the deflection part, a liquid crystal deflection element or a deflection mirror may be employed. A description will first be given of the case of employing a liquid crystal deflection element.

The liquid crystal deflection element is an optical deflector that performs optical deflection by using a liquid crystal. A variety of conventional liquid crystal deflection elements are known. The liquid crystal deflection elements are categorized into two types: those driven by an electrical signal and those driven by a magnetic signal. Here, a description will be given of the former type of liquid crystal deflection element.

The liquid crystal deflection elements driven by an electrical signal are roughly divided into two types. In the first type, the electrical signal varies the refractive indexes of the liquid crystal deflection elements. In the second type, the electrical signal causes diffraction in the liquid crystal deflection elements.

An example of the first type of liquid crystal deflection element using variation in the refractive index is disclosed in Japanese Laid-Open Patent Application 8-313941. According to the liquid crystal deflection element disclosed in this patent application, a liquid crystal is provided with a refractive index gradient so as to deflect a light beam passing through the liquid crystal. As an electrical signal driving this liquid crystal deflection element, a modulated signal having a pulse-like or sinusoidal waveform and having an average voltage of approximately zero volts is preferred. In this case, deflection can be controlled by varying the pulse duty ratio of the pulse signal.

Figure 4:
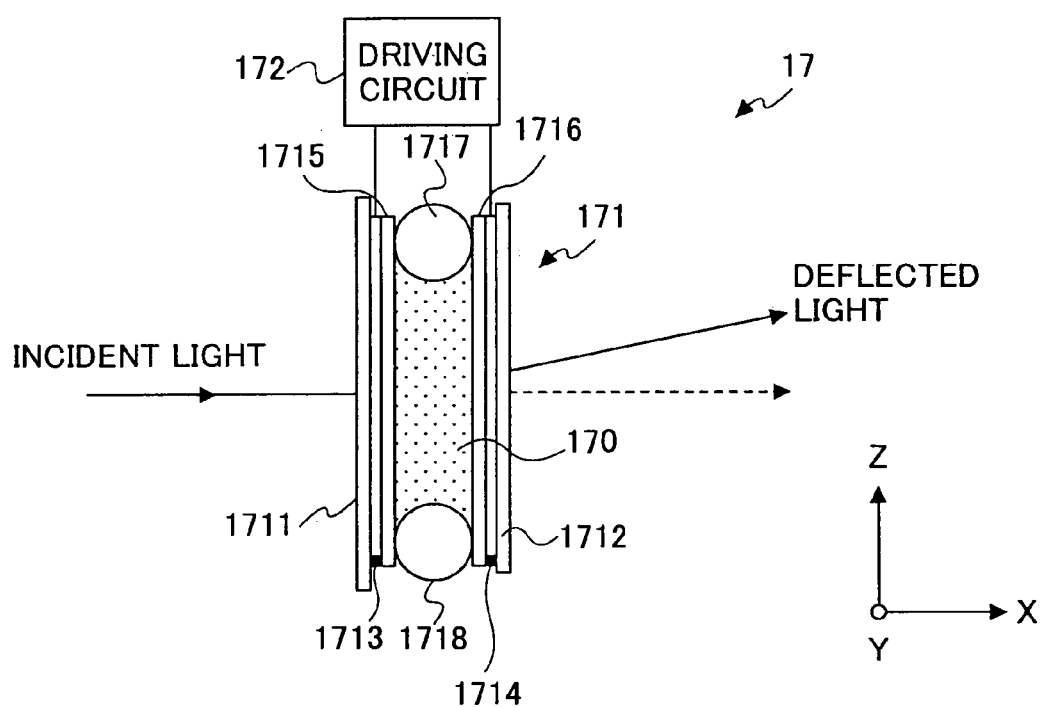
FIG. 4 is a diagram showing a liquid crystal deflection element used for correction for fine adjustment according to the first embodiment of the present invention.

FIG. 4 is a diagram showing a liquid crystal deflection element of the second type, which causes diffraction by an electrical signal. This type of liquid crystal deflection element is expatiated in the above-described patent application (8-313941).

According to FIG. 4, a liquid crystal deflection element 17 is formed of a liquid crystal cell 171 and a driving circuit 172 driving the liquid crystal cell 171. The liquid crystal cell 171 includes a pair of opposing glass substrates 1711 and 1712 parallel to each other. Transparent electrodes 1713 and 1714 are formed of ITO on the opposing surfaces of the glass substrates 1711 and 1712, respectively. Alignment films 1715 and 1716 are formed on the transparent electrodes 1713 and 1714 so that a liquid crystal 170 is sealed in the form of a thin film in a space defined by the alignment films 1715 and 1716 and spacers 1717 and 1718 interposed therebetween. The driving circuit 172 applies a driving voltage between the transparent electrodes 1713 and 1714.

The liquid crystal 170 is, for instance, a nematic liquid crystal having negative dielectric anisotropy in which the dielectric constant is smaller in the axial direction of a liquid crystal molecule than in the direction perpendicular to the axial direction. The molecules of the liquid crystal 170 are aligned by the alignment films 1715 and 1716 so that the axial direction of the molecules is perpendicular to the X-Z plane of FIG. 4.

When a DC voltage or a voltage of a frequency lower than or equal to approximately 300 Hz is applied between the transparent electrodes 1713 and 1714 by the driving circuit 172, a diffraction grating pattern is formed in the liquid crystal 170 so that its stripe pattern extends in a direction parallel to the alignment direction of the molecules (that is, its stripe pattern extends along the Y-axis of FIG. 4).

In this state, when a light beam is made incident on the liquid crystal cell 171 as shown in FIG. 4, the diffraction grating pattern generates a diffracted light beam of the transmitted light. When the value of the DC or low-frequency voltage is varied, the diffraction grating pattern is formed with a different grating pitch so as to have a different angle of diffraction.

Accordingly, with respect to $1^{st}$-order diffracted light, for instance, by adjusting the deflection angle of the $1^{st}$-order diffracted light, the light beam can be deflected at a desired deflection angle in a desired direction (along the X-Z plane in the case of FIG. 4). On the other hand, when a high-frequency voltage is applied between the transparent electrodes 1713 and 1714 of the liquid crystal cell 171, the diffraction grating pattern is formed in the liquid crystal 170 in the direction perpendicular to the alignment direction of the molecules, so that diffracted light in a direction along the X-Y plane is obtained. In this case, the angle of diffraction can be varied by changing the envelope of the applied high-frequency voltage.

Figure 5B:
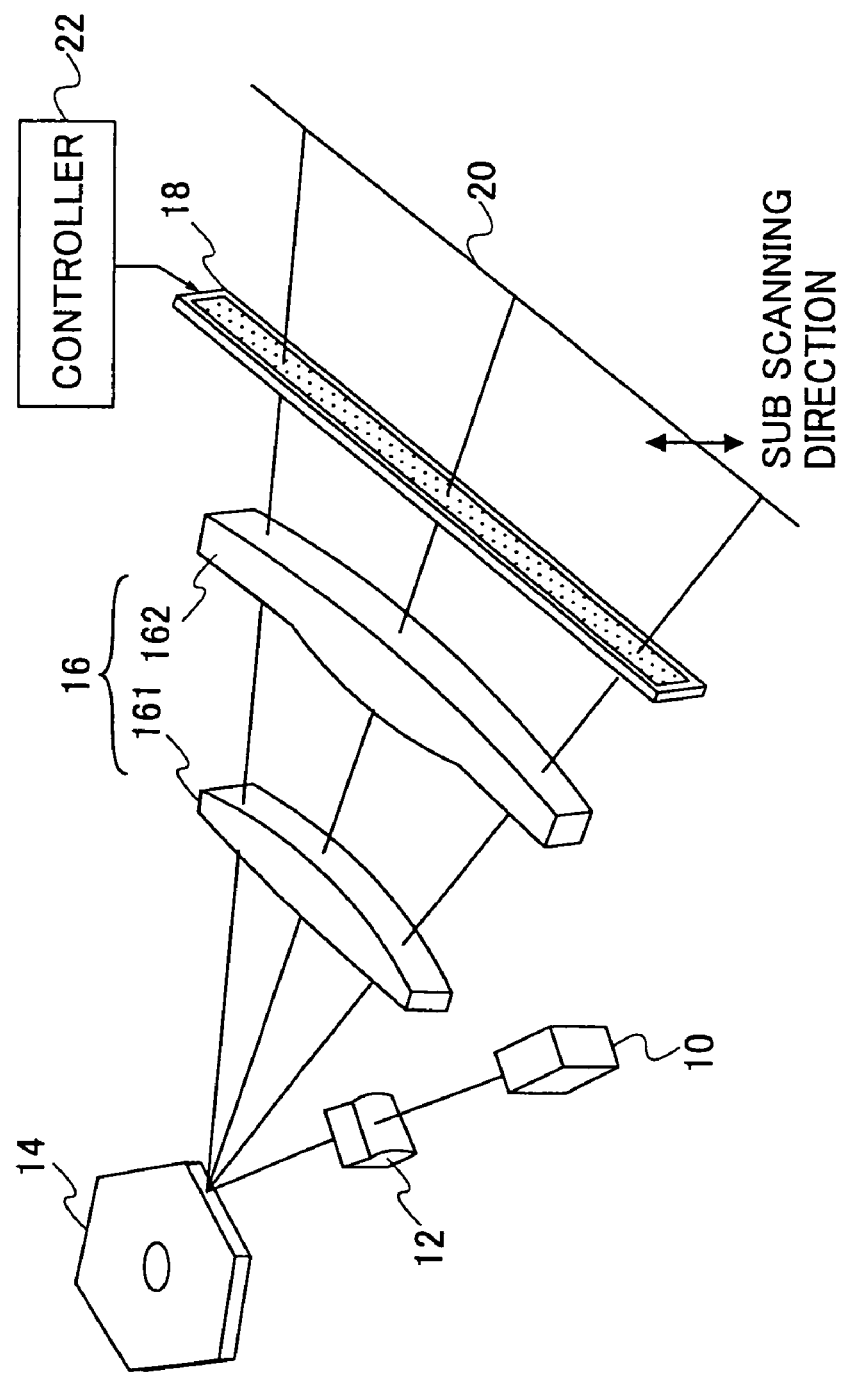

FIGS. 5A and 5B are diagrams showing optical scanners performing correction for fine adjustment on scanning line curving using a liquid crystal deflection element according to the first embodiment of the present invention.

According to the optical scanner of FIG. 5A, a parallel light beam or a weak divergent or convergent light beam is emitted from a light source device 10 formed of a semiconductor laser and a coupling lens to be transmitted through a liquid crystal deflection element 17. Then, the light beam is condensed in the sub scanning direction by a cylindrical lens 12 so as to be focused approximately (or exactly) on a deflecting and reflecting surface of a polygon mirror 14 as a line image extending along the main scanning direction.

The deflected light beam reflected from the polygon mirror 14 passes through lenses 161 and 162 forming an fθ lens 16 as a scanning and imaging optical system to be focused into a light spot on a scanning surface 20, thereby performing optical scanning. At this point, recombination of image data is performed through the operation of a control part such as a microcomputer (not shown in the drawing) so that an image is written to the scanning surface 20 by the divided writing method.

In the optical scanner of FIG. 5A, the liquid crystal deflection element 17 and a controller 22 form a deflection part. The controller 22 is set as one of the functions of the control part controlling the entire imaging apparatus.

As described above with reference to FIG. 4, the liquid crystal deflection element 17 deflects a light beam by using diffraction. However, the liquid crystal deflection element 17 may deflect a light beam by forming a refractive index distribution. Further, the liquid crystal deflection element 17 may be driven by a magnetic signal.

Every time optical scanning is performed with the light spot, the controller 22 controls deflection of a light beam in the sub scanning direction by the liquid crystal deflection element 17, thereby performing correction for fine adjustment on scanning line curving that is not completely correctable by the divided writing method.

The optical scanner of FIG. 5B includes a liquid crystal deflection element array 18 and the controller 22 that form a deflection part. The liquid crystal deflection element array 18 is formed of a plurality of liquid crystal deflection elements having the same function as the liquid crystal deflection element 17 of FIG. 5B, the liquid crystal deflection elements being arranged in an array along the main scanning direction. Each of the liquid crystal deflection elements forming the array performs correction for fine adjustment in a corresponding predetermined section. In the optical scanner of FIG. 5A, every time the light spot performs optical scanning, the liquid crystal deflection element 17 is required to vary its deflection for correction for fine adjustment during the optical scanning. Meanwhile, the liquid crystal deflection element array 18 of FIG. 5B enables correction for fine adjustment to be performed at a time in every optical scan. Therefore, the liquid crystal deflection element array 18 has the merit of enabling employment of a liquid crystal deflection element having a slow response speed.

Figure 6A:
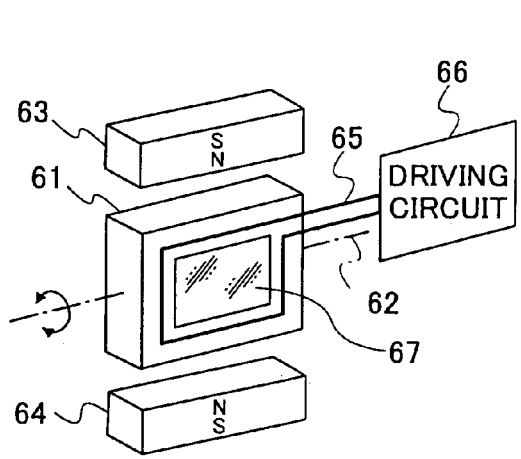
FIGS. 6A and 6B are diagrams showing typical deflection mirrors.
Figure 6B:
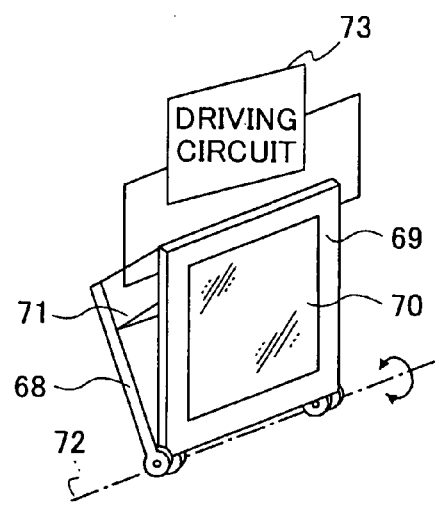

In the above description, a liquid crystal deflection element is employed as the deflection part of the optical scanner. However, the deflection part for fine adjustment of scanning line curving can be realized otherwise than by the liquid crystal deflection element. A deflection mirror may be employed as the deflection part. The deflection mirror is an optical device that can vary the orientation of its reflecting surface at high speed within a relatively narrow range. A variety of deflection mirrors are known. FIGS. 6A and 6B are diagrams showing typical deflection mirrors.

The deflection mirror of FIG. 6A employs magnetic force as its driving force.

In the deflection mirror of FIG. 6A, a substrate 61 is supported rotatably about an axis 62 by a support mechanism (not shown in the drawing). A mirror face 67 is formed on one side of the substrate 61. A coil 65 is formed so as to surround the mirror face 67. Thereby, a vibration element is formed. Stationary magnets 63 and 64 are fixedly provided from the upper and lower sides of the vibration element so as to sandwich the vibration element therebetween, thereby providing magnetic fields in the vertical directions of the vibration element. A resilient force is exerted on the substrate 61 by a spring (not shown in the drawing) so as to maintain the substrate 61 at a neutral position.

When a driving current is supplied from a driving circuit 66 to the coil 65, the Lorentz force is generated by the interaction between the driving current flowing through the coil 65 and the magnetic fields provided by the stationary magnets 63 and 64. The Lorentz force generates torque in the vibration element, thereby varying the orientation of the mirror face 67. The driving current supplied to the coil 65 may be a rectangular wave, a sinusoidal wave, or a DC current. In the case of supplying a DC current to the coil 65, the mirror face 67 can be maintained and fixed at a certain orientation.

By controlling the driving current supplied to the coil 65, the orientation of the mirror face 67 can be controlled. The substrate 61 is formed of silicon. The coil 65 and the mirror face 67 are formed in thin films by vapor deposition or plating. By thus forming the coil 65 and the mirror face 67 on the single silicon substrate 61, a lightweight deflection mirror can be manufactured at low cost by using semiconductor processing. Since the vibration element is lightweight, high-speed driving can be realized at low energy.

The deflection mirror of FIG. 6B takes advantage of the piezoelectric effect.

The deflection mirror of FIG. 6B includes a stationary plate 68 and a rotatable substrate 69 that are engaged like a hinge so that the rotatable substrate 69 can rotate about an axis 72. A mirror face 70 is formed in a thin film on the rotatable substrate 69 by vapor evaporation or plating. Instead of using vapor evaporation, the mirror face 70 may be formed by forming the rotatable substrate 69 of metal aluminum and performing mirror-finishing on the surface thereof.

A piezoelectric element 71 is fixed so as to be sandwiched between the free end of the rotatable substrate 69 and the free end of the stationary plate 68. The piezoelectric element 71 is driven by a driving circuit 73 generating an electrical signal of a frequency higher than or equal to 2 KHz, thereby rotating the rotatable substrate 69 about the axis 72.

By providing such a deflection mirror as is described with reference to FIG. 6A or 6B between a light source and an optical deflection and scanning part (polygon mirror) so as to deflect a light beam emitted from the light source in the sub scanning direction, scanning line curving that is not completely correctable by the divided writing method can be finely adjusted to be corrected.

Figure 6C:
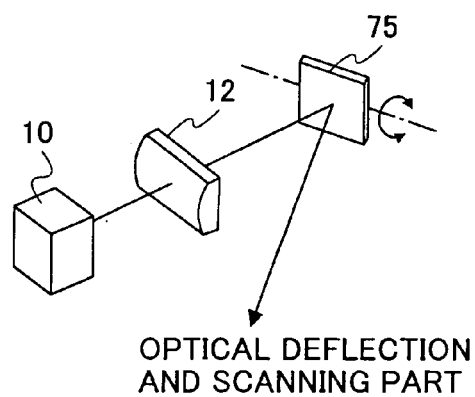
FIGS. 6C and 6D are diagrams for illustrating configurations for correction for fine adjustment using the deflection mirrors according to the first embodiment of the present invention.
Figure 6D:
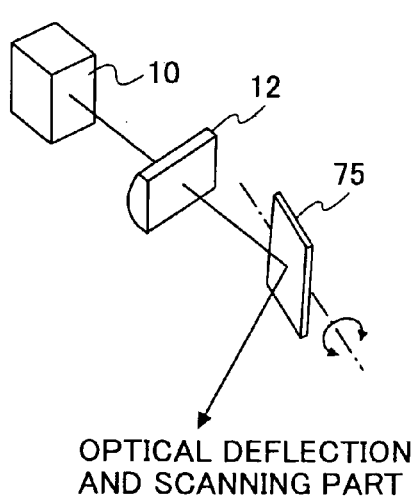

Each of FIGS. 6C and 6D shows a configuration where a deflection mirror 75 such as any of the foregoing deflection mirrors is provided between the cylindrical lens 12 and the optical deflection and scanning part so as to deflect a light beam emitted from the light source in the sub scanning direction. For instance, by removing the liquid crystal deflection element 17 and the liquid crystal deflection element array 18 from the optical scanners of FIGS. 5A and 5B and changing the system between the light source device 10 and the polygon mirror 14 as shown in FIGS. 6C and 6D, respectively, correction for fine adjustment can be realized by using the deflection mirror 75.

According to the first embodiment of the present invention, correction for fine adjustment using the liquid crystal deflection element or the deflection mirror as the deflection part can also be realized in the optical scanner shown in FIGS. 2A and 2B.

In the above description, scanning line curving (including scanning line tilting), which is a deviation from an ideal scanning position in the sub scanning direction, is corrected. As previously described, as a scanning characteristic, there also exists a deviation of the scanning position of a light spot in the main scanning direction, the deviation resulting from the constant velocity characteristic (fθ characteristic) as a scanning characteristic in the main scanning direction. The deviation of a scanning position in the main scanning direction and the deviation of a scanning position in the sub scanning direction are substantially independent of each other. Therefore, the deviation in the main scanning direction and the deviation in the sub scanning direction can be corrected simultaneously.

In addition to the above-described correction of scanning line curving, the optical scanner according to the first embodiment of the present invention may correctively adjust the position of a light spot in the main scanning direction. For this purpose, the optical scanner according to the first embodiment of the present invention shifts the phase of the pixel clock signal of image data to be written based on a clock signal whose frequency is higher than that of the pixel clock signal.

The pixel clock signal is a clock signal for causing a light spot to write one pixel.

To correctively adjust the position of a light spot in the main scanning direction means to adjust the light spot position on the scanning surface with respect to each image height so that the light spot position matches or approximates the ideal position in the main scanning direction.

Conventionally, electrical correction of a positional deviation of a light spot in the main scanning direction is known, the deviation resulting from the fθ characteristic. This deviation results from the fact that the light spot does not move in the main scanning direction at a constant speed. Basically, therefore, the dot position at which the light spot writes a pixel can be adjusted, where the light spot moves at a speed higher (lower) than a predetermined speed (at which the ideal fθ characteristic is realized), by advancing (delaying) the rise timing of the pixel clock signal and simultaneously reducing (increasing) the time width of the pixel clock signal.

By performing this adjustment pixel by pixel, a positional deviation of the light spot in the main scanning direction can be completely corrected in principle.

FIG. 7A shows a configuration for adjusting the position of a light spot in the main scanning direction according to the first embodiment of the present invention.

As shown in FIG. 7A, photosensors 701 and 702 are provided on both sides of the effective scanning region of the light spot formed on a scanning surface 700 by the deflected light beam of the optical scanner. When optical scanning is performed, a time counter 703 counts the time that the light spot takes to move between the photosensors 701 and 702, and the count value of the time counter 703 is input to a look-up table 704.

The fθ characteristic (constant velocity characteristic) in the optical scanner is known. The look-up table 704 stores positional corrections to be made in the main scanning direction so that the positional corrections are correlated with their corresponding time values counted by the time counter 703. Thus, the correction (value) corresponding to the count value of the time counter 703 is set based on the stored contents of the look-up table 704.

The correction value is applied to a phase-locked loop (PLL) 705. A clock signal is input from a clock generator circuit 706 to the PLL 705. The clock signal generated in the clock generator circuit 706 has a frequency higher than that of the pixel clock signal. When the pixel clock signal is generated based on the clock signal whose frequency is n (for instance, eight) times that of the pixel clock signal, with respect to the reference length T of the pixel clock signal, the rise timing (phase) of the pixel clock signal can be shifted in units of T/n, and the length of the pixel clock signal can be varied in units of T/n.

The PLL 705, using the clock signal supplied from the clock generator circuit 706, generates a pixel clock signal whose rise timing is shifted and whose signal length is changed based on the correction value obtained from the look-up table 704. Then, the PLL 705 applies the generated pixel clock signal to an image processing circuit 707. The image processing circuit applies image data and the pixel clock signal to a semiconductor laser driving circuit 708.

The semiconductor laser driving circuit 708 switches ON and OFF a semiconductor laser 709 in predetermined timing based on the pixel clock signal in accordance with the image data. The light spot whose position is adjusted in the main scanning direction writes the image data based on the switching timing and the ON-time (light-emitting) period of the semiconductor laser 709.

Figure 7B:
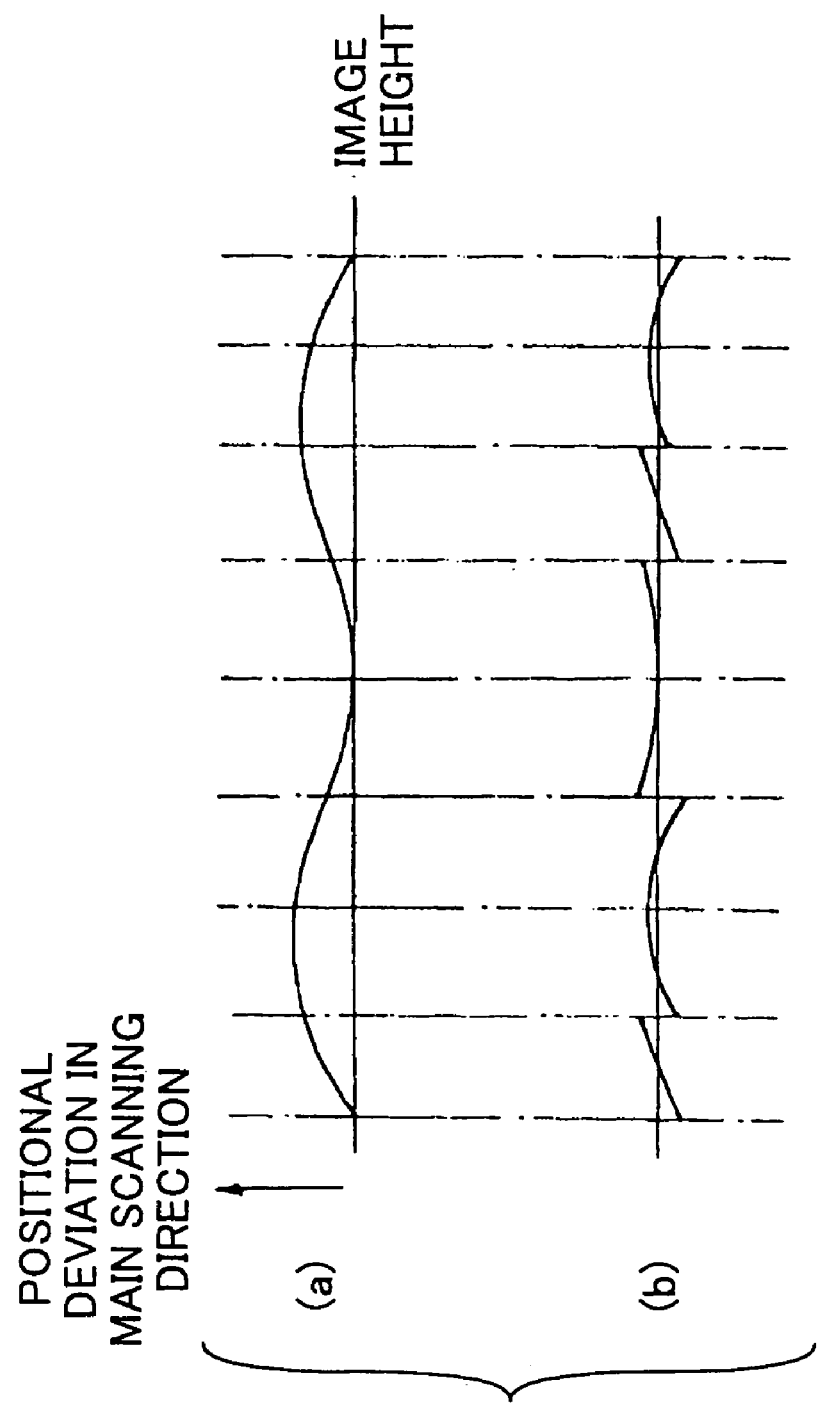

For instance, the deviation of a light spot position in the main scanning direction based on the constant velocity characteristic varies as shown in (a) of FIG. 7B. In FIG. 7B, the vertical axis represents positional deviation in the main scanning direction, and the horizontal axis represents the image height of the light spot.

In this case, as one method of correcting a positional deviation in the main scanning direction, the range of the image height is divided into eight regions as shown in (a) of FIG. 7B. Here, the range of the image height is divided into eight regions for convenience of description and graphical representation. Practically, however, it is appropriate to divide the range into fifteen to thirty regions. Further, it is better for the range of the image height to be unequally divided, than to be equally divided, so that part of the range where the light spot moves at a higher speed is divided into more regions.

Each of the regions thus divided is provided with the corresponding phase shift and signal length of the pixel clock signal. In each divided region, optical scanning is performed based on the pixel clock signal with the corresponding phase shift and signal length determined for the region. Thereby, the deviation of the light spot in the main scanning direction is effectively reduced in each region of the image height range as shown in (b) of FIG. 7B compared with the uncorrected deviation shown in (a) of FIG. 7B. The greater the number of regions into which the image height range is divided, the more effectively a deviation in the main scanning direction can be reduced.

The above-described adjustment (correction) of scanning line curving (including scanning line tilting) and a position in the main scanning direction may be performed by optimizing the contents of the correction at the time of initial adjustment of the imaging apparatus including the optical scanner. Practically, however, when the imaging apparatus operates for a long period of time, an object of correction may vary over time. Further, in the case of employing a resin optical device, its optical properties may vary due to changes in environmental conditions such as temperature and humidity, thereby causing variation in the object of correction.

In this point of view, it is desirable to timely detect an occurrence of scanning line curving and/or a deviation of a scanning position in the main scanning direction and optimize correction based on the detection results.

In order to achieve such correction, the optical scanner according to the first embodiment of the present invention may include a scanning position detecting part detecting the scanning position of a light spot formed by a deflected light beam.

Figure 8A:
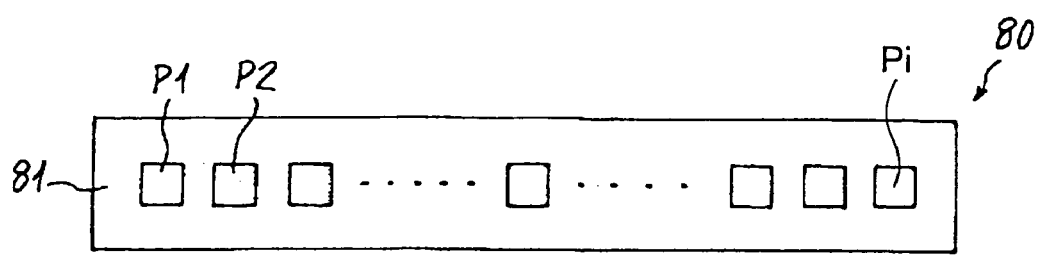
FIGS. 8A and 8B are diagrams for illustrating a scanning position detecting part employed in the optical scanner according to the first embodiment of the present invention.
Figure 8B:
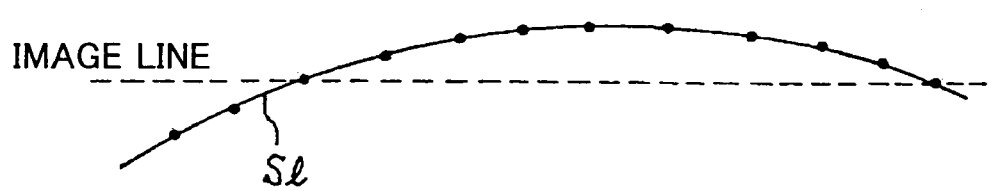

FIGS. 8A and 8B are diagrams for illustrating a scanning position detecting part 80 according to the first embodiment of the present invention.

In FIG. 8A, the scanning position detecting part 80 includes a plurality of area sensors Pi (i=1, 2, . . . ) so that the light-receiving surfaces of the area sensors Pi are arranged on a stationary plate 81 in the main scanning direction. The area sensors Pi are provided so that the light-receiving surfaces thereof occupy positions optically equivalent to the scanning surface. The area sensors Pi are scanned by a deflected light beam or a detection light beam that is a separated part of the deflected light beam. Two-dimensional CCDs or CMOS sensors are employed as the area sensors Pi.

For instance, prior to performing an imaging process by optical scanning, a light source is caused to emit light so that an optical scan is performed over the area sensors Pi of the scanning position detecting part 80. At this point, the light source emits light at an interval so that the deflected light beam or the detection light beam of each emitted light is made incident on the corresponding area sensor Pi, thereby successively scanning the area sensors Pi.

The scanning position detecting part 80 outputs the position of the light spot in the sub scanning direction detected by each area sensor Pi to an operation part, which may be formed as part of the functions of a control part controlling the entire imaging apparatus, for instance.

In FIG. 8B, a group of black circles arranged along a curve S1 indicate the thus detected positions in the sub scanning direction. In FIG. 8B, the broken line indicates an image line, which is straight in the main scanning direction.

The controller approximates the form of a scanning line as a polynomial by the method of least squares based on the detected light spot positions (scanning positions) in the sub-scanning direction. The polynomial is the detected scanning line curving, which is indicated by the curve S1.

A positional deviation of a light spot in the main scanning direction due to the fθ characteristic may be specified by detecting the scanning position of the light spot in the main scanning direction with each area sensor Pi.

A description will be given herein of detection of a scanning position in the main scanning direction by the scanning position detecting part 80.

Figure 9A:
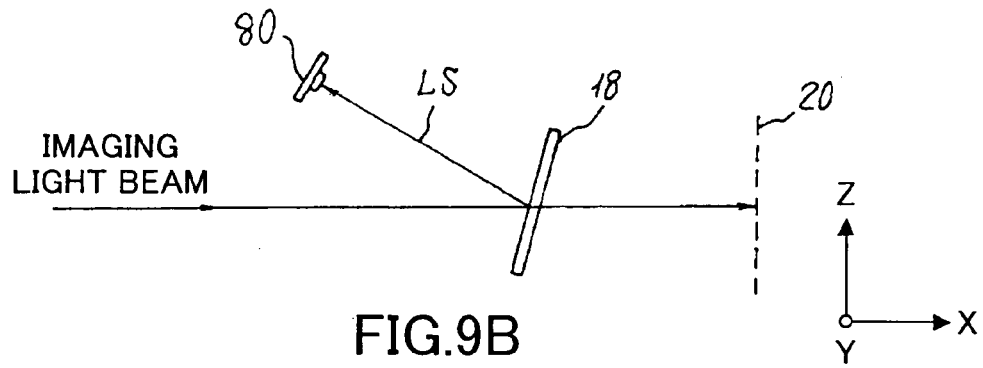
FIGS. 9A and 9B are diagrams showing configurations for detecting a scanning position using the scanning position detecting part of FIGS. 8A and 8B, and FIGS. 9C and 9D are diagrams showing other configurations for detecting a scanning position according to the first embodiment of the present invention.
Figure 9B:
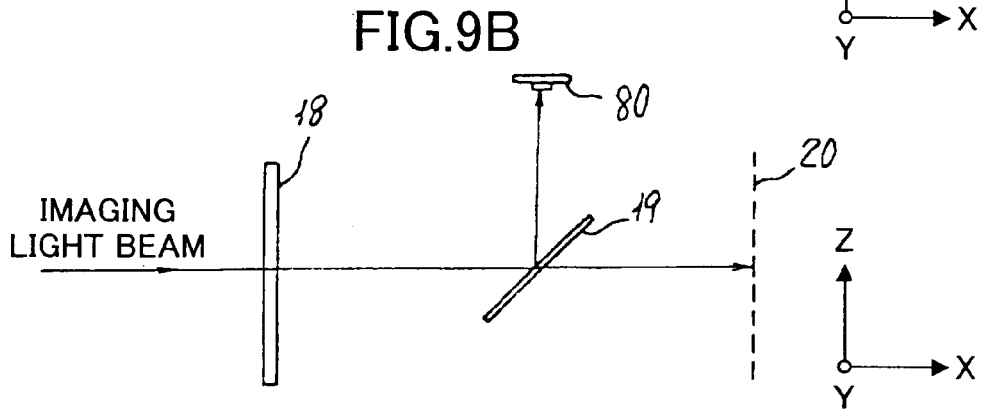

As previously described, the scanning position detecting part 80 has the area sensors Pi arranged so that the light-receiving surfaces thereof occupy positions optically equivalent to the scanning surface. Further, the area sensors Pi are scanned by a deflected light beam or a detection light beam that is separated from the deflected light beam. FIGS. 9A and 9B show specific configurations for detecting a scanning position in this case.

In FIG. 9A, the Y-axis corresponds to the main scanning direction, and the Z-axis corresponds to the sub scanning direction. In the optical scanner of FIG. 5B, a scanning position is detected by a method as shown in FIG. 9A. The liquid crystal deflection element array 18 is provided with a slight inclination to the sub scanning direction in the optical path of an imaging light beam deflected in the main scanning direction.

As a result, part of the imaging light beam is reflected from the surface of incidence of the liquid crystal deflection element array 18 to become a detection light beam LS. The detection light beam LS forms a light spot on the light-receiving surface of the scanning position detecting part 80, the light-receiving surface being provided on a surface equivalent to the scanning surface 20 with the surface of incidence of the liquid crystal deflection element array 18 serving as a reflecting surface. Thereby, the scanning position is detected.

In FIG. 9B, the Y-axis corresponds to the main scanning direction, and the Z-axis corresponds to the sub scanning direction. An imaging light beam deflected in the main scanning direction and transmitted through the liquid crystal deflection element array 18 is reflected from a reflecting surface member 19 provided with an inclination to the sub scanning direction in the optical path of the imaging light beam. Then, the reflected light beam forms a light spot on the light-receiving surface of the scanning position detecting part 80, the light-receiving surface being provided on a surface equivalent to the scanning surface 20 with respect to the reflecting surface of the reflecting surface member 19. Thereby, the scanning position is detected.

The reflecting surface member 19 may be formed of transparent glass to be constantly positioned as shown in FIG. 9B so as to reflect and separate part of the imaging light beam toward the scanning position detecting part 80. Alternatively, the reflecting surface member 19 may be provided so as to be capable of moving in or out of the optical path of the imaging light beam. In this case, the reflecting surface member 19 is positioned in the optical path as shown in FIG. 9B only when scanning position detection is performed.

Figure 9C:
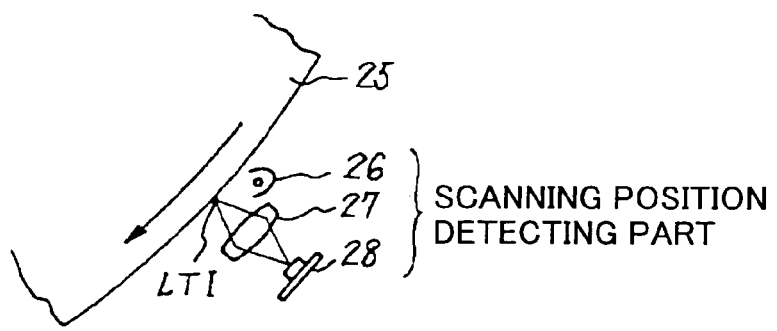
Figure 9D:
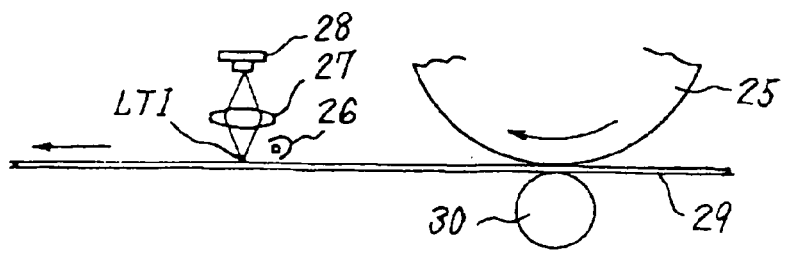

The configurations of FIGS. 9A and 9B are employed in the case of detecting a scanning position by directly detecting a light spot formed by a deflected light beam. However, the scanning position is not always required to be detected by detecting a light spot. FIGS. 9C and 9D shows other configurations for scanning position detection according to the first embodiment of the present invention.

In FIG. 9C, the scanning position is the position of a light spot on the light-sensitive surface of a photoconductive photosensitive body 25 substantially forming the scanning surface. Therefore, a linear toner image LTI obtained by making visible a latent image obtained by performing writing for one scanning line on the photosensitive body 25 by an imaging process is the visible image of the written scanning line.

The toner image LTI is illuminated with a lamp 26 so as to be focused through an imaging system 27 on an image sensor 28. The image sensor 28 reads the focused image, thereby detecting its scanning line curving based on the reading results. In this case, the lamp 26, the imaging system 27, and the image sensor 28 form the scanning position detecting part.

In FIG. 9D, the linear toner image LTI formed on the photosensitive body 25 as in the case of FIG. 9C is transferred through a transfer part 30 onto an intermediate transfer belt 29 serving as an intermediate transfer medium. The transferred toner image LTI is illuminated with the lamp 26 so as to be focused through the imaging system 27 on the image sensor 28. The image sensor 28 reads the focused image, thereby detecting its scanning line curving based on the reading results. In this case, the lamp 26, the imaging system 27, and the image sensor 28 also form the scanning position detecting part.

After the scanning line curving is detected, the linear toner image LTI is removed from the photosensitive body 25 in the case of FIG. 9A and from the photosensitive body 25 and the intermediate transfer belt 29 in the case of FIG. 9B by a cleaning part (not shown in the drawing).

In order to detect a scanning position in the main-scanning direction to detect the constant velocity characteristic, a required number of linear images each having an appropriate length in the sub scanning direction are written in the main scanning direction parallel to each other and are made visible. Ideally, the linear images (straight lines) extending in the sub scanning directions are equally spaced in the main scanning direction. The visible straight lines are detected on the photosensitive body 25 or the intermediate transfer belt 29, and the intervals between adjacent straight lines are checked. Thereby, the constant velocity characteristic can be determined.

The scanning position is thus detected by the scanning position detecting part according to the first embodiment of the present invention. The scanning position can also be detected as follows without using the scanning position detecting part. That is, in this case, the toner image LTI formed as described above is transferred and fixed to a transfer paper sheet, so that the degree of scanning line curving (including scanning line tilting) and the constant velocity characteristic are measured based on the image obtained on the transfer paper sheet. Based on the measurement results, deflection in each liquid crystal deflection element of the liquid crystal deflection element array is determined.

When the optical system is not affected by environmental changes or is configured so as to automatically correct the effect of environmental changes, the degree of scanning line curving and the constant velocity characteristic are measured in advance to be stored in the control part as data for correction. Correction may be performed as described above based on the stored data for correction.

Second Embodiment

A description will be given of a second embodiment of the present-invention.

Figure 10:
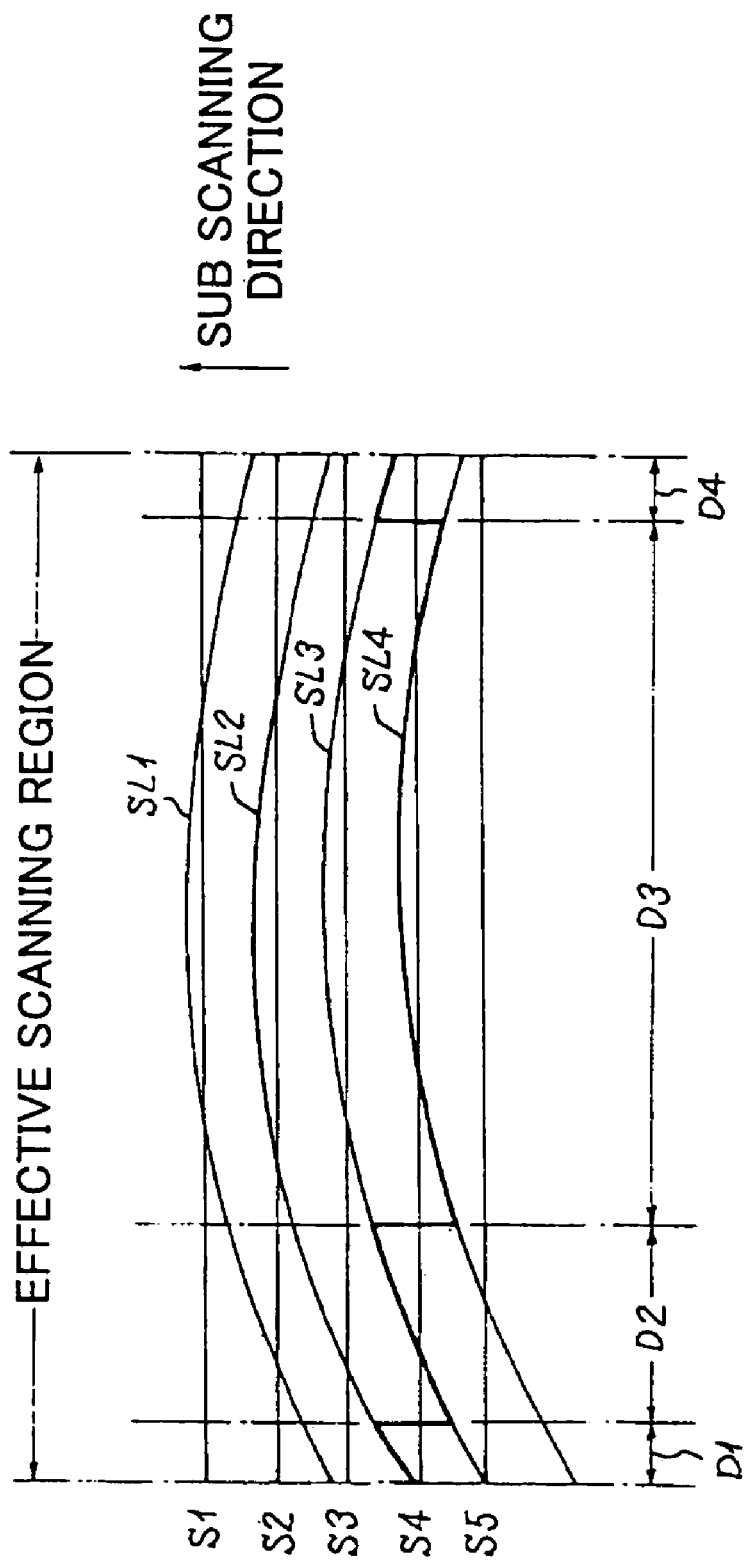
FIG. 10 is a diagram for illustrating a light-selective writing method employed in an optical scanner according to a second embodiment of the present invention.

FIG. 10 is a diagram for illustrating an optical scanner according to the second embodiment of the present invention. FIG. 10 is similar in format to FIG. 1. In FIG. 10, reference numerals S1 through S5 denote five successive image lines as in FIG. 1. The difference between FIGS. 1 and 10 lies in that the five scanning lines SL1 through SL5 of FIG. 1 are drawn by as many optical scans successively performed by a single light spot while the four scanning lines SL1 through SL4 of FIG. 10 are simultaneously drawn by as many light spots. That is, according to the second embodiment of the present invention, the scanning surface is scanned line-sequentially by multi-beam scanning with four light spots. The scanning lines SL1 through SL4 have substantially the same scanning line curving characteristic.

That is, according to the optical scanner of the second embodiment of the present invention, a light beam emitted from a light source modulated based on image data is deflected in the main scanning direction by an optical deflection and scanning part. The deflected light beam is condensed toward a scanning surface by a scanning and imaging optical system so as to form a light spot on the scanning surface. The scanning surface is optically scanned by the light spot. Particularly, in the optical scanner according to the second embodiment of the present invention, the light source emits a plurality of light beams so that the light beams form respective light spots on the scanning surface, the light spots being separated from each other in the sub scanning direction. The light spots are formed to have substantially the same scanning line curving characteristic, and the scanning surface is optically scanned simultaneously with the light spots.

When the light spots are spaced in the sub scanning direction at an interval (intervals) substantially equal to an interval (intervals) at which image lines are spaced, and the optical system has substantially the same magnification for each image height, the scanning lines may be considered as including substantially the same scanning line curving.

The effective scanning region is divided into a plurality of regions Di (i=1, 2, . . . ) (four regions in the case of FIG. 10) based on the scanning line curving characteristic. In each optical scan using the light spots simultaneously, one of the light beams is selected in each region Di of each image line, the one being suitable for optical scanning in the corresponding region Di. Thereby, the image data for each image line is written with the corrected scanning line curving. This writing, method may be referred to as a "light-selective writing method."

The light-selective writing method is a method that performs the above-described divided writing method with multiple light beams. Since the divided writing method employs one light spot, the light spot writes information to different image lines as the light spots draws a curved scanning line in one optical scan. However, in the case of optically scanning a scanning surface simultaneously by a plurality of light spots spaced in the sub scanning direction, letting the number of light spots be N, writing can be performed to N image lines simultaneously. Therefore, when the divided writing method is applied to the optical scan of each light spot, the most suitable one of the light spots is selected for writing each image line in each scanning region (because of this characteristic, this method is referred to as the light-selective writing method) and the N image lines can be written simultaneously.

In the case of writing an image to the image line S4 of FIG. 10, for instance, the image is written by selecting: the light beam related to scanning by the scanning line SL2 in the region D1; the light beam related to scanning by the scanning line SL3 in the region D2; the light beam related to scanning by the scanning line SL4 in the region D3; and the light beam related to scanning by the scanning line SL3 in the region D4.

Similarly, the light-selective writing method is performed simultaneously with respect to the other image lines S1, S2, S3, and S5. Thus, the scanning line curving is effectively corrected while benefiting from the high speed characteristic of multi-beam optical scanning, thereby realizing excellent optical scanning.

The above-described methods of correction for fine adjustment are also applicable to the optical scanner of the second embodiment of the present invention. Further, the optical scanner of the second embodiment can also perform the above-described adjustment of a scanning position in the main scanning direction in parallel with the correction of scanning line curving.

Third Embodiment

Figure 11:
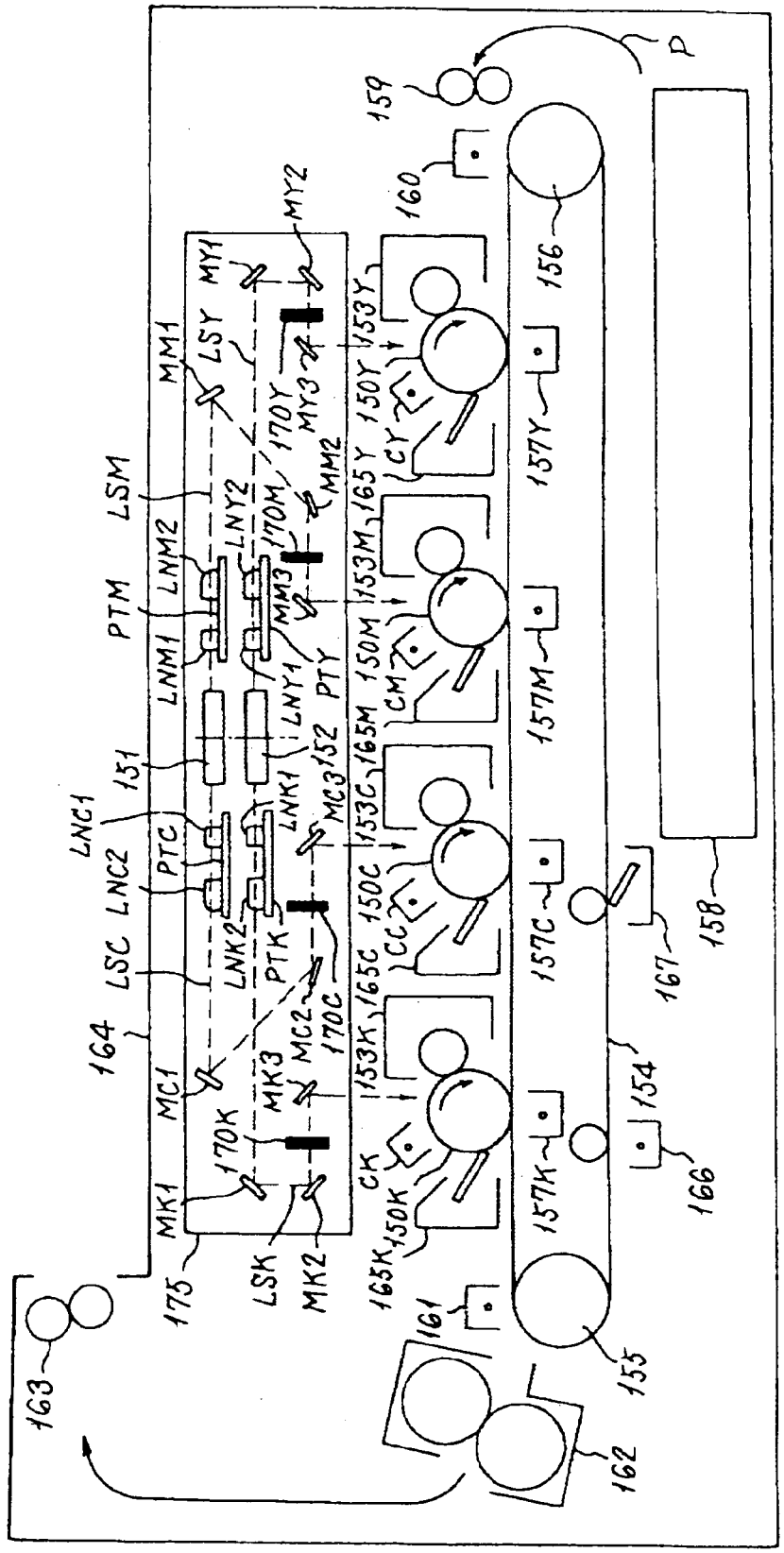
FIG. 11 is a diagram showing an imaging apparatus according to a third embodiment of the present invention.

FIG. 11 is a diagram showing an imaging apparatus according to a third embodiment of the present invention.

The imaging apparatus of FIG. 11 forms a color image by employing photoconductive photosensitive bodies as photosensitive media. According to the imaging apparatus, component images of four colors of magenta, cyan, yellow, and black are formed to be superimposed on a sheet-like recording medium. Thereby, the color image is obtained.

The imaging apparatus includes polygon mirrors 151 and 152 having the same shape. The polygon mirrors 151 and 152 are fixed to a common shaft so as to rotate together with the shaft as a single unit. The polygon mirrors 151 and 152, together with a driving part (not shown in the drawing), form an optical deflection and scanning part.

The imaging apparatus further includes four light source devices, which are not graphically represented in FIG. 11. Light beams emitted from two of the light source devices are incident on the polygon mirror 151, and light beams emitted from the other two of the light source devices are incident on the polygon mirror 152. The optical arrangement (system) in each of the optical paths between the light source devices and the polygon mirrors 151 and 152 of the imaging apparatus of FIG. 11 is equal to that of the imaging apparatus of the first embodiment shown in FIGS. 2A and 2B.

Light beams LSY and LSK deflected by the polygon mirror 152 are light beams for writing the yellow component image and the black component image, respectively.

The intensity of the deflected light beam LSY is modulated by information for the yellow component image to pass through lenses LNY1 and LNY2 forming an fθ lens as a scanning and imaging optical system. The lenses LNY1 and LNY2 are held on a holding body PTY. Then, the deflected light beam LSY is reflected by optical path bending mirrors MY1, MY2, and MY3 successively. Thus, the deflected light beam LSY is guided to the light-sensitive surface of a photoconductive photosensitive body 150Y so as to optically scan the light-sensitive surface, which substantially forms the scanning surface.

The photosensitive body 150Y is cylindrical. Being evenly charged by a charger CY while rotating in the direction of the arrow in FIG. 11, the photosensitive body 150Y is optically scanned by the light spot of the deflected light beam LSY. Thereby, the yellow component image is written to the photosensitive body 150Y, so that a yellow latent image is formed thereon.

The intensity of the deflected light beam LSK is modulated by information for the black component image to pass through lenses LNK1 and LNK2 forming an fθ lens. The lenses LNK1 and LNK2 are held on a holding body PTK. Then, the deflected light beam LSK is reflected by optical path bending mirrors MK1, MK2, and MK3 successively. Thus, the deflected light beam LSK is guided to the light-sensitive surface of a photoconductive photosensitive body 150K so as to optically scan the light-sensitive surface.

The photosensitive body 150K is cylindrical. Being evenly charged by a charger CK while rotating in the direction of the arrow in FIG. 11, the photosensitive body 150K is optically scanned by the light spot of the deflected light beam LSK. Thereby, the black component image is written to the photosensitive body 150K, so that a black latent image is formed thereon.

Light beams LSM and LSC deflected by the polygon mirror 151 are light beams for writing the magenta component image and the cyan component image, respectively.

The intensity of the deflected light beam LSM is modulated by information for the magenta component image to pass through lenses LNM1 and LNM2 forming an fθ lens. The lenses LNM1 and LNM2 are held on a holding body PTM. Then, the deflected light beam LSM is reflected by optical path bending mirrors MM1, MM2, and MM3 successively. Thus, the deflected light beam LSM is guided to the light-sensitive surface of a photoconductive photosensitive body 150M so as to optically scan the light-sensitive surface.

The photosensitive body 150M is cylindrical. Being evenly charged by a charger CM while rotating in the direction of the arrow in FIG. 11, the photosensitive body 150M is optically scanned by the light spot of the deflected light beam LSM. Thereby, the magenta component image is written to the photosensitive body 150M, so that a magenta latent image is formed thereon.

The intensity of the deflected light beam LSC is modulated by information for the cyan component image to pass through lenses LNC1 and LNC2 forming an fθ lens. The lenses LNC1 and LNC2 are held on a holding body PTC. Then, the deflected light beam LSC is reflected by optical path bending mirrors MC1, MC2, and MC3 successively. Thus, the deflected light beam LSC is guided to the light-sensitive surface of a photoconductive photosensitive body 150C so as to optically scan the light-sensitive surface.

The photosensitive body 150C is cylindrical. Being evenly charged by a charger CC while rotating in the direction of the arrow in FIG. 11, the photosensitive body 150C is optically scanned by the light spot of the deflected light beam LSC. Thereby, the cyan component image is written to the photosensitive body 150C, so that a cyan latent image is formed thereon.

Each of the photosensitive bodies 150Y, 150K, 150M, and 150C is optically scanned by single-beam scanning in this embodiment. However, the photosensitive bodies 150Y, 150K, 150M, and 150C may be optically scanned by multi-beam scanning. In the case of employing single-beam scanning, the divided writing method described in the first embodiment is performed. In the case of employing multi-beam scanning, the light-selective writing method described in the second embodiment is performed. Further, the above-described adjustment of a scanning position in the main scanning direction and/or the above-described methods of correction for fine adjustment are performed as required.

Recombination of image data required for the divided writing method or the light-selective writing method is controlled by a control part (not shown in the drawing). The control part includes a microcomputer and controls the entire imaging apparatus.

Further, each of the chargers CY, CK, CM, and CC is of a corona-discharge type. However, a charger of a contact type, such as a charging roller or a charging brush, may be employed as each of the chargers CY, CK, CM, and CC.

The yellow, magenta, cyan, and black latent images formed on the photosensitive bodies 150Y, 150M, 150C, and 150K, respectively, are developed by corresponding development devices 153Y, 153M, 153C, and 153K with the corresponding color toners (yellow, magenta, cyan, and black toners) to be made visible.

Thus, the yellow toner image, the magenta toner image, the cyan toner image, and the black toner image are formed on the photosensitive bodies 150Y, 150M, 150C, and 150K, respectively. These toner images are transferred onto a transfer paper sheet P that is a sheet-like recording medium in the following manner.

As shown in FIG. 11, an endless conveyer belt 154 is fastened over pulleys 155 and 156 so as to contact the bottom of each of the photosensitive bodies 1SOY, 150M, 150C, and 150K. Inside the endless conveyer belt 154, transfer devices 157Y, 157M, 157C, and 157K are provided so as to oppose the corresponding photosensitive bodies 150Y, 150M, 150C, and 150K, respectively, through the internal surface of the conveyer belt 154. In this embodiment, the transfer devices 157Y, 157M, 157C, and 157K are of a corona-discharge type. However, a transfer device of a contact type, such as a transfer roller, may be used as each of the transfer devices 157Y, 157M, 157C, and 157K.

The transfer paper sheet P as a sheet-like recording medium is fed from a cassette 158 containing a stack of transfer paper sheets, and is placed onto the conveyer belt 154 by feed rollers 159. Then, the transfer paper sheet P is charged by a charger 160 to be attached to and held on the outside surface of the conveyer belt 154 by electrostatic suction. The conveyer belt 154 rotates counterclockwise to convey the transfer paper sheet P held on its outside surface.

While the transfer paper sheet P is being conveyed as described above, first, the transfer device 157Y transfers the yellow toner image on the photosensitive body 150Y to the transfer paper sheet P. Then, the transfer devices 150M, 150C, and 150K successively transfer the magenta, cyan, and black toner images to the transfer paper sheet P. When the toner images are transferred, the toner images are positioned relative to one another so as to be superimposed one over the other.

Thus, the color image is formed on the transfer paper sheet P. The transfer paper sheet P with the color image is discharged by a discharger 161, and peels off the conveyer belt 154 due to its own firmness. Then, the color image is fixed on the transfer paper sheet P by a fixing device 162, and the transfer paper sheet P is ejected by ejection rollers 163 onto a tray 164, which also serves as the top plate of the imaging apparatus.

After the toner images are transferred, residual toner and paper powder are removed from the photosensitive bodies 150Y, 150M, 150C, and 150K by corresponding cleaners 165Y, 165M, 165C, and 165K. Further, the conveyer belt 154 is discharged by a discharger 166 and cleaned by a cleaner 167.

This is the outline of the imaging process in a full-color mode. A monochrome black and white image can be formed by forming an image only on the photosensitive body 150K.

The color image may be formed in two or more (multiple) colors depending on the combinations of photosensitive bodies on which images are to be formed.

As a method of transferring color toner images to a transfer paper sheet, the well-known transfer method that forms a color image on an intermediate transfer belt by transferring color toner images thereto and transfers the color image to a transfer paper sheet may be employed instead of the method employed in this embodiment.

As previously described, in this color-image forming apparatus, its scanning and imaging optical system is the four fθ lenses provided for the deflected light beams LSY, LSM, LSC, and LSK, respectively. Each fθ lens is formed of two lenses. These four fθ lenses are optically equivalent to one another. The optical paths from the light source devices to the corresponding photosensitive bodies 150Y, 150M, 150C, and 150K are designed to have the same length. These optical system components are provided in an optical housing 175 as shown in FIG. 11.

The lenses LNY1, LNM1, LNC1, and LNK1 are formed of the same resin material. The lenses LNY2, LNM2, LNC2, and LNK2 are formed of the same resin material. Polycarbonate, which is excellent in low water absorbency, high transparency, and formability, or a synthetic resin including polycarbonate as its main component is a suitable resin material for these lenses. Using a resin material makes it easy to form an aspheric surface and also reduces material cost, therefore being advantageous in reducing the cost of the color-image forming apparatus.

On the other hand, the optical properties of a resin lens vary due to the effect of changes in temperature and humidity. Therefore, the degree of scanning line curving and tilting and the constant velocity characteristic also vary in accordance with environmental changes. Accordingly, liquid crystal deflection element arrays 170Y, 170M, 170C, and 170K, which are equal to the liquid crystal deflection element array 18 shown in FIG. 5B, are provided in the optical paths of the deflected light beams LSY, LSM, LSC, and LSK scanning the photosensitive bodies 150Y, 150M, 150C, and 150K, respectively, as shown in FIG. 11. Thereby, as previously described, the positions of the light spots on the photosensitive bodies 150Y, 150M, 150C, and 150K are adjusted in the sub scanning direction, and scanning line curving and the constant velocity characteristic are corrected by adjusting the positions of the light spots in the main scanning direction by shifting the phases of image clock signals.

In a tandem color-image forming apparatus as shown in FIG. 11, if the degree of scanning line curving differs among images formed on the photosensitive bodies, the problem of "color misregistration" becomes apparent. Therefore, by correcting scanning line curving with respect to each of the photosensitive bodies as described above so that the images formed on the photosensitive bodies have substantially the same degree of scanning line curving, the problem of "color misregistration" can be effectively reduced or prevented.

Although not shown in FIG. 11, the scanning positions of the light spots that the deflected light beams LSY, LSM, LSC, and LSK form on the corresponding photosensitive bodies 150Y, 150M, 150C, and 150K are detected by the corresponding scanning position detecting parts (not shown in the drawing) equal to the scanning position detecting part 80 shown in FIG. 8A. The scanning position detecting parts are provided at the positions optically equivalent to the corresponding scanning surfaces. In order to guide parts of the deflected light beams LSY, LSM, LSC, and LSK to the corresponding scanning position detecting parts, the liquid crystal deflection element arrays 170Y, 170M, 170C, and 170K are provided with a slight inclination to the sub scanning direction in the optical paths of the deflected light beams LSY, LSM, LSC, and LSK, respectively, thereby reflecting the detection light beams toward the corresponding scanning position detecting parts as previously described with reference to FIG. 9A.

Instead of forming the entire scanning and imaging optical system of the imaging apparatus of resin lenses as described above, only one of the pairs of lenses, for instance, the paired lenses LNK1 and LNK2, may be formed, as an optical system serving as a scanning position reference, of a glass having a small coefficient of thermal expansion in order to eliminate the effect of temperature change. The scanning line curving included in each of optical scans performed by the deflected light beams LSY, LSM, and LSC and the scanning position in the main scanning direction of each of the light spots formed by the deflected light beams LSY, LSM, and LSC may be corrected by the corresponding one of the liquid crystal deflection element arrays 170Y, 170M, and 170C provided in the optical paths of the deflected light beams LSY, LSM, and LSC so as to match the scanning line curving and the light spot position in the main scanning direction of the deflected light LSK formed into an image by the lenses LNK1 and LNK2.

In this case, the fθ lens formed by the lenses LNK1 and LNK2 is configured so as to be equivalent in optical properties to the other fθ lenses. Further, the liquid crystal deflection element arrays 170Y, 170M, and 170C are employed in the optical paths of the deflected light beams LSY, LSM, and LSC while no liquid crystal deflection element array is required in the optical path of the deflected light beam LSK, thereby causing a difference in length between the optical path of the deflected light beam LSK and the optical path of each of the deflected light beams LSY, LSM, and LSC. Therefore, a transparent parallel plate equivalent in optical thickness (physical thickness multiplied by refractive index) to the liquid crystal deflection element array 170K is provided as its replacement in the optical path of the deflected light beam LSK, thereby eliminating the above-described difference in optical path length.

Thereby, the imaging apparatus is not required to provide liquid crystal deflection element arrays in the optical paths of all the deflected light beams LSY, LSM, LSC, and LSK. Further, expensive glass lenses are used only for the reference scanning and imaging optical system (lenses LNK1 and LNK2), and the other scanning and imaging optical systems can be formed of inexpensive plastic lenses. Therefore, the color-image forming apparatus can be realized at low cost as a whole, and a high-quality color image with reduced color misregistration can be obtained.

That is, according to such a tandem color-image forming apparatus, N ($\geq 2$; four in this embodiment) photoconductive photosensitive bodies are provided along the conveying path of a sheet-like recording medium. Different electrostatic latent images are written to and formed on the photosensitive bodies by optical scanning. The electrostatic latent images are made visible as toner images of different colors. The toner images are transferred to the sheet-like recording medium and fixed, being superimposed one over the other. An optical scanner is provided for each of the photosensitive bodies. A black toner image is formed on one of the photosensitive bodies (photosensitive body 150K). The optical scanners for the photosensitive bodies other than the one for the black toner image (photosensitive bodies 150Y, 150M, and 150C) may be any of the optical scanners of the above-described first and second embodiments. Of scanning line curving and a light spot position in the main scanning direction, at least scanning line curving is corrected based on the black toner image.

The electrostatic latent images are formed by evenly charging each of the photosensitive bodies and optically scanning the photosensitive bodies with the optical scanners.

According to the imaging apparatus of this embodiment, based on the black toner image, scanning line curving in the toner images of the other colors is corrected. It is the black toner image that dominantly affects resolution (sharpness) and graininess (roughness) among the image qualities of a color image. By correcting scanning line curving in the toner images of the other colors based on the black toner image, a high-quality color image simultaneously satisfying resolution and graininess as well as color misregistration can be obtained. Further, the amount of data requiring correction is reduced, thereby giving a cost advantage.

The correction of scanning line curving according to the present invention may be effectively used in combination with the conventional mechanical correction of scanning line curving.

The imaging apparatus of the third embodiment may be realized as an optical color printer, a digital color copier, or a color facsimile machine.

Fourth Embodiment

A description will now be given of a fourth embodiment of the present invention.

An optical scanner according to the fourth embodiment may have a configuration as shown in FIGS. 2A and 2B. Therefore, the above description given with reference to FIGS. 2A and 2B is referred to for the configuration and operation of the optical scanner of this embodiment.

According to FIGS. 2A and 2B, the optical scanner of this embodiment includes a plurality (four) optical scanning parts. In each of the optical scanning parts, a light beam emitted from the modulated light source 1A (1A', 1B, 1B') is deflected by the optical deflection and scanning part 4. The deflected light beam is guided by the scanning and imaging optical system (lenses.) 5A (5A', 5B, 5B') and 6A (6A', 6B, 6B') so as to form a light spot on the scanning surface 8A (8A', 8B, 8B'). The scanning surface 8A (8A', 8B, 8B') is scanned by the optical spot. Images for composing a desired image are written separately to the corresponding scanning surfaces (regions) 8A, 8A', 8B, 8B'.

The light beam emitted from the modulated light source has the same meaning as the above-described light beam emitted from the light source modulated based on the image data.

The scanning region is substantially the photosensitive surface of a photosensitive medium, and includes the above-described concept of the scanning surface. However, individual scanning regions may be separate scanning surfaces (the photosensitive surfaces of different photosensitive bodies, for instance), or a scanning surface may be divided into different scanning regions.

That is, according to the optical scanner of this embodiment, each optical scanning part includes a combination of optical elements which combination guides a light beam emitted from the light source (1A, 1A', 1B, 1B') and forms the light beam into a light spot on the corresponding scanning surface (8A, 8A', 8B, 8B'). This combination is formed of, for instance, the light source 1A, the coupling lens 2A, the aperture AP, the cylindrical lens 3A, the optical deflection and scanning part 4, the lenses 5A and 6A, and the mirrors MA1 through MA3 for optical path bending. The light-sensitive surface of each of the photoconductive photosensitive bodies 8A, 8A', 8B, and 8B' is an individual scanning surface and at the same time the "scanning region (region to be scanned)." That is, the four scanning regions are arranged in the sub scanning direction.

As previously described, the electrostatic latent images corresponding to the yellow, magenta, cyan, and black images are formed on the photosensitive bodies 8A', 8A, 8B, and 8B', respectively. The latent images are made visible with the corresponding color toners into the yellow, magenta, cyan, and black toner images, respectively. These toner images are transferred to a sheet-like recording medium (not shown in the drawing), positioned relative to one another and superimposed one over the other. The transferred toner images are fixed so that a color image is formed.

At this point, in at least one of the scanning regions, an exposure distribution may be formed to have a center of gravity between adjacent scanning lines in the sub scanning direction so that the position of the center of gravity may be shifted in the sub scanning direction. According to this embodiment, the exposure distribution is formed to have a center of gravity between adjacent scanning lines in the sub scanning direction on each of the photosensitive bodies 8A', 8A, and 8B when the electrostatic latent images made visible by the color toners other than the black toner are formed on the scanning region of each of the photosensitive bodies 8A', 8A, and 8B.

The exposure distribution having the center of gravity between the scanning lines adjacent in the sub scanning direction refers to a composite light intensity distribution formed by superimposing, in the sub scanning direction, the light intensity distributions of two light spots formed adjacently in the sub scanning directions on scanning lines adjacent in the sub scanning direction on a scanning surface, the composite light intensity distribution having a center of gravity between the adjacent scanning lines. By varying the light intensities of the two light spots relative to each other so that the light intensity of one of the light spots becomes higher while the light intensity of the other becomes lower, the position of the center of gravity may be shifted in the sub scanning direction.

According to the optical scanner of the first embodiment, scanning line curving that is included in one scanning line and not completely correctable by the divided writing method is corrected by adjusting the position of the center of gravity of the thus formed exposure distribution. On the other hand, according to the optical scanner of the fourth embodiment, the adjustment of the position of the center of gravity is performed over the entire region of the scanning lines formed in the scanning region.

According to this embodiment, optical scanning may be performed on each of the photosensitive bodies 8A', 8A, and 8B by single-beam scanning so that the exposure distribution is formed to have a center of gravity between adjacent scanning lines in the sub scanning direction by successive optical scans.

A description will now be given of the case where the scanning lines on the photosensitive bodies (scanning regions) 8A', 8A, and 8B (referred to as a yellow, magenta, and cyan scanning line, respectively) are relatively corrected based on the scanning line (referred to as a black scanning line) on the photosensitive body 8B' on which the electrostatic latent image to be made visible with the black toner, and the color toner images are superimposed one over the other so that the yellow, magenta, and cyan scanning lines are superimposed on the black scanning line.

Generally, the black scanning line includes a curve. In this embodiment, however, for convenience of description, the black scanning line is set to be straight and the other color scanning lines are linearly corrected.

Since the yellow, magenta, and cyan scanning lines are corrected in the same manner in principle, the case of correcting the yellow scanning line will be described.

FIGS. 12A through 12E are diagrams for illustrating the correction of scanning line curving by the optical scanner according to the fourth embodiment of the present invention.

Figure 12A:
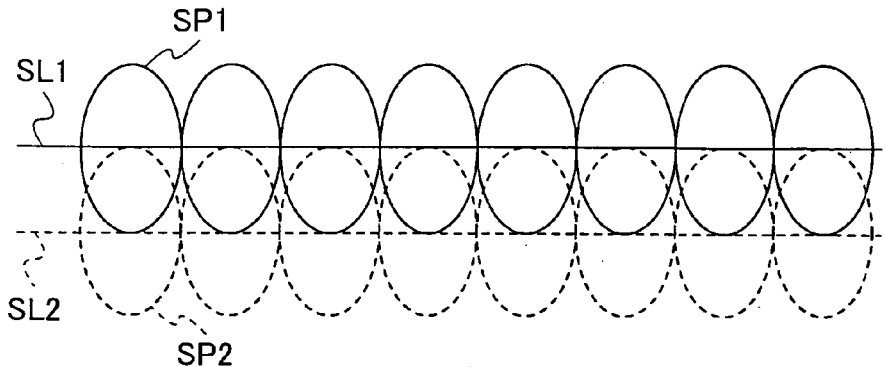
FIGS. 12A through 12E are diagrams for illustrating correction of scanning line curving by an optical scanner according to a fourth embodiment of the present invention.

In FIG. 12A, reference numerals SL1 and SL2 refer to the scanning lines formed on the photosensitive body 8A' by optical scanning. In FIG. 12A, the vertical directions correspond to the sub scanning direction. As previously described, optical scanning is performed by single-beam scanning. Therefore, the scanning line SL1 is formed by one optical scan, and the scanning line SL2 is formed by the subsequent optical scan.

If the image written by each scanning line is a line extending in the main scanning direction, a light spot SP1 closely illuminates the scanning line SL1 so as to form a long linear latent image. Further, the scanning line SL2 is exposed by a light spot SP2.

FIG. 12A shows the ideal state where no scanning line curving exists in any of the scanning lines SL1 and SL2 (or the state where each of the scanning lines SL1 and SL2 matches its corresponding image line). The scanning line SL1, which is straight in FIG. 12A, corresponds to the trace of movement of the center of the light spot SP1. The light spot SP1 has a Gaussian light intensity distribution, and the center of the light spot SP1 corresponds to the position of the part of maximum intensity of the light intensity distribution. Likewise, the straight scanning line SL2 corresponds to the trace of movement of the center of the light spot SP2.

Figure 12B:
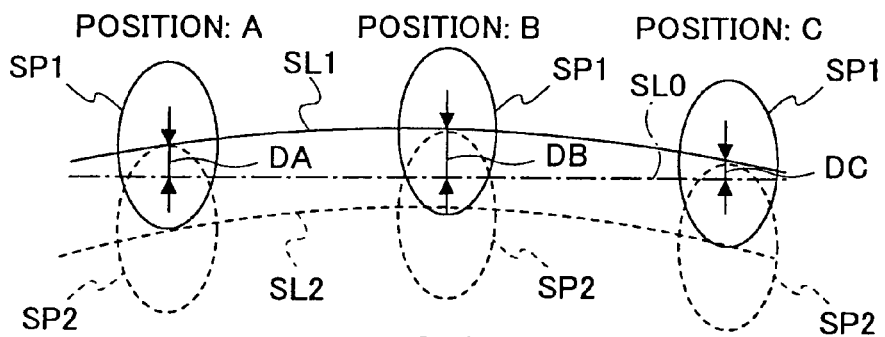

Generally, scanning line curving exists in an actual scanning line. FIG. 12B illustrates the case where the scanning line includes a curve, that is, scanning line curving exists in the scanning line. As in the above-described case of FIG. 12A, the scanning lines SL1 and SL2 in FIG. 12B are the traces of movement of the light spots SP1 and SP2 of the two successive optical scans. When the scanning line SL1 thus includes a curve, the composite exposure distribution of the light intensity distribution of the light spot SP1 for optical scanning along the scanning line SL1 and the light intensity distribution of the light spot SP2 for optical scanning along the scanning line SL2 is used to correct the scanning line SL1 and obtain a straight scanning line SL0.

In the position A in FIG. 12B, for instance, the straight scanning line SL0, to which the scanning line SL1 is to be corrected, passes a point a little closer to the scanning line SL1 between the scanning lines SL1 and SL2.

Figure 12C:
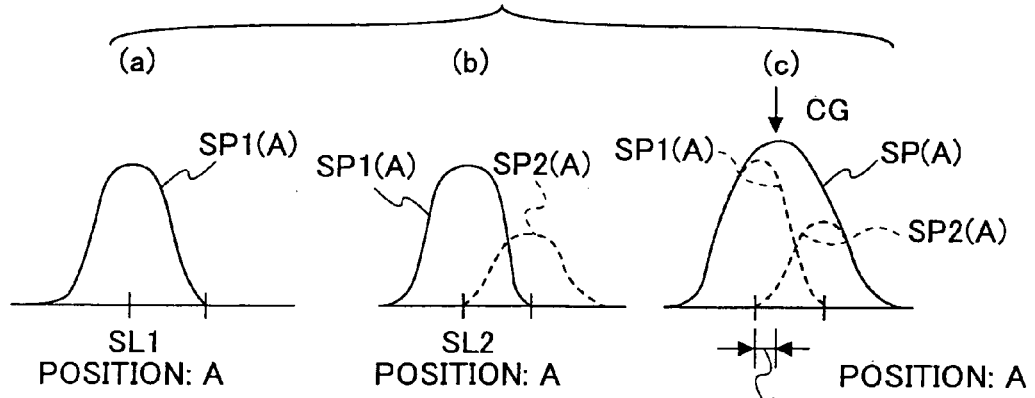

Therefore, when the light spot SP1 performs optical scanning along the scanning line SL1, at the position A, the light spot SP1 performs exposure with a light intensity distribution SP1 (A), which is "slightly strong" as its light intensity distribution, as shown in (a) of FIG. 12C. When the light spot SP2 successively performs optical scanning along the scanning line SL2, at the position A, the light spot SP2 performs exposure with a light intensity distribution SP2 (A), which is "slightly weak" as its light intensity distribution, as shown in (b) of FIG. 12C. In FIG. 12C, the horizontal axis represents the sub scanning direction, and the vertical directions represent exposure intensity.

Thereby, an exposure distribution SP (A), which is the sum of the light intensity distribution SP1 (A) and the light intensity distribution SP2 (A), is formed at the position A as shown in (c) of FIG. 12C when optical scanning is performed along the scanning lines SL1 and SL2. At this point, the center of gravity position of the exposure distribution SP (A) becomes the position of the scanning line SL0 at the position A. That is, in (c) of FIG. 12C, the distance DA between the scanning line SL1 and the center of gravity of the exposure distribution SP (A) at the position A is equal to the difference between the scanning lines SL1 and SL0 at the position A shown in FIG. 12B.

As a method of adjusting the light intensity distribution of each light spot in order to change the center of gravity position of the exposure distribution, a method that changes modulation time for writing each pixel (pulse width modulation), a method that changes the amount of light of a light beam emitted from a light source (power modulation), or the combination of these methods is employable.

Figures 12D, 12E:
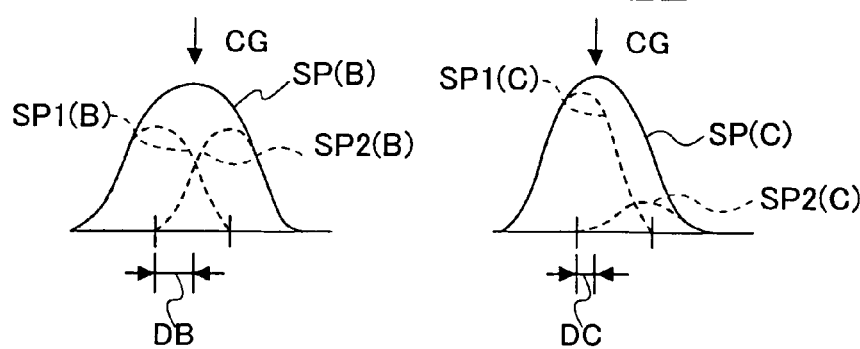

At the position B in FIG. 12B, the scanning line SL0 is positioned substantially in the center between the scanning lines SL1 and SL2. Therefore, at this point, at the position B, the light spot SP1 performs exposure with a light intensity distribution SP1 (B) as its light intensity distribution and the light spot SP2 performs exposure with a light intensity distribution SP2 (B), which is substantially equal to the light intensity distribution SP1 (B), as its light intensity distribution so that the resulting composite exposure distribution SP (B) has its center of gravity positioned substantially in the center between the scanning lines SL1 and SL2 as shown in FIG. 12D.

At this point, the distance DB between the scanning line SL1 and the center of gravity of the exposure distribution SP (B) is equal to the distance between the scanning lines SL1 and SL0 at the position B as shown in FIG. 12B.

At the position C in FIG. 12B, the scanning line SL0 is positioned closer to the scanning line SL1 between the scanning lines SL1 and SL2. Therefore, at this point, at the position C, the light spot SP1 performs exposure with an increased light intensity distribution SP1 (C) as shown in FIG. 12E and the light spot SP2 performs exposure with a reduced light intensity distribution SP2 (C) as shown in FIG. 12E so that the resulting composite exposure distribution SP (C) has its center of gravity positioned closer to the scanning line SL1.

At this point, the distance DC between the scanning line SL1 and the center of gravity of the exposure distribution SP (C) is equal to the distance between the scanning lines SL1 and SL0 at the position C as shown in FIG. 12B.

The light intensity distribution of the light spot SP1 for optical scanning along the scanning line SL1 and the light intensity distribution of the light spot SP2 for optical scanning along the scanning line SL2 are controlled relative to each other as described above over the entire optical scanning region so that the center of gravity position of the exposure distribution formed by the light spots SP1 and SP2 moves along the scanning line SL0. Thereby, the scanning line SL in which scanning line curving is linearly corrected can be obtained.

That is, when a dot line extending in the main scanning direction is formed on the scanning region (photosensitive body 8A') on which an exposure distribution is formed between the scanning lines SL1 and SL2 adjacent to each other in the sub scanning direction, the distance between one of the adjacent scanning lines (scanning line SL1) and the center of gravity of the exposure distribution in the sub scanning direction may be varied according to the position in the main scanning direction. In this case, the position of the center of gravity of the exposure distribution may be shifted in a stepped manner in the sub scanning direction. Further, the distance between the one of the adjacent scanning lines (scanning line SL1) and the center of gravity of the exposure distribution in the sub scanning direction may be varied continuously according to the position in the main scanning direction.

As is apparent from the above description, the center of gravity position of the exposure distribution formed by the light intensity distributions of the light spots SP1 and SP2 formed by successive optical scans can be changed to a desired position between the two light spots SP1 and SP2 by adjusting the sizes of the light intensity distributions of the light spots SP1 and SP2 relative to each other. Therefore, not only the center of gravity position of the exposure distribution can be adjusted to a desired straight line or curve, but also the trace of the center of gravity position of the exposure distribution (or the corrected scanning line) can be shifted in the sub scanning direction.

Thus, the scanning line curving and the position in the sub scanning direction of the yellow scanning line are adjusted so that the yellow scanning line can match the black scanning line. Thereby, the yellow toner image can be superimposed suitably on the black toner image.

For instance, when a yellow scanning line SLY1 is inclined to a black scanning line SLBL as shown in FIG. 13, the center of gravity position SLY of the exposure distribution formed by a light spot for optical scanning along the yellow scanning line SLY1 and a light spot for optical scanning along a yellow scanning line SLY2 can be matched with the black scanning line SLBL. That is, in this case, the intensity of the light spot for optical scanning along the yellow scanning line SLY1 is controlled so as to increase as the optical scanning position moves from left to right in FIG. 13, and the intensity of the light spot for optical scanning along the yellow scanning line SLY2 is controlled so as to be high at the beginning and gradually decrease thereafter.

The above-described case is an example of forming a corrected scanning line between the scanning lines SL1 and SL2 with the center of gravity of an exposure distribution by correcting the scanning lines SL1 and SL2. However, such correction may not be enough to straighten the corrected scanning line if the scanning line includes a curve of a certain size. In such a case, the scanning line can be corrected as desired by employing light spots for optical scanning along three or more scanning lines. FIGS. 14A through 14E show such a case.

In FIG. 14A, the scanning lines SL1, SL2, and SL3 are the traces of light spots in three successive optical scans. In the case of obtaining the substantially straight scanning line SL0 by correcting scanning line curving, for instance, at the position A, exposure is performed with the light intensity distribution SP3 (A) of the light spot for optical scanning along the scanning line SL3 as shown in FIG. 14B since the position of the scanning line SL0 matches the position of the scanning line SL3 at the position A.

At the position B, exposure is performed with the light intensity distribution SP2 (B) of the light spot for optical scanning along the scanning line SL2 as shown in FIG. 14C. At the position C, the center of gravity position of the composite exposure distribution of the light intensity distribution SP1 (C) of the light spot for optical scanning along the scanning line SL1 and the light intensity distribution SP2 (C) of the light spot for optical scanning along the scanning line SL2 is matched with the position of the scanning line SL0 as shown in FIG. 14D. At the position D, exposure is performed with the light intensity distribution SP1 (D) of the light spot for optical scanning along the scanning line SL1 as shown in FIG. 14E.

Thus, the substantially straight scanning line SL0 can be realized by using one or combined two of the light spots for optical scanning along the three scanning lines SL1, SL2, and SL3. The correction can also be performed by using one or combined two of light spots for optical scanning along four or more scanning lines.

Thereby, the position of the center of gravity of an exposure distribution for forming a dot line extending in the main scanning direction can be shifted over a plurality of scanning lines (the scanning lines SL1 and SL2 in FIG. 14A) adjacent in the sub scanning direction.

This means the following. That is, letting the scanning lines adjacent in the sub scanning direction be scanning lines i−1, i, and i+1, the center of gravity of the exposure distribution formed by the light spot on the scanning line i−1 and the light spot on the scanning line i can be shifted in position between the scanning lines i−1 and i by relatively adjusting the light intensities of the light spots. Further, the center of gravity of the exposure distribution formed by the light spot on the scanning line i and the light spot on the scanning line i+1 can be shifted in position between the scanning lines i and i+1 by relatively adjusting the light intensities of the light spots.

Thus, by adjusting the light intensities of adjacent two of light spots formed on three or more scanning lines while writing one of the scanning lines, the center of gravity of the exposure distribution may be shifted between two or more of the scanning lines (the scanning lines i−1, i, and i+1 in the above-described case). This is the case where the center of gravity of an exposure distribution is shifted over a plurality of scanning lines.

In the above-described case, the yellow scanning line has its scanning line curving and its position in the sub scanning direction corrected so as to match the black scanning line. In the very same manner as described above, the magenta scanning line and the cyan scanning line can be corrected so as to coincide with the black scanning line.

That is, in at least one of the scanning regions (in this embodiment, in each of the photosensitive bodies 8A', 8A, and 8B of the photosensitive bodies 8A', 8A, 8B, and 8B') that are provided in the sub scanning direction, an exposure distribution may be formed to have a center of gravity between scanning lines adjacent in the sub scanning direction. The position of the center of gravity in the sub scanning direction may be shifted. Thereby, the optical scanning positions in the sub scanning direction in the scanning regions may be corrected relative to each other. In this case, the center of gravity of the exposure distribution can also be shifted over a plurality of scanning lines. Further, scanning line curving in one scanning region may be corrected relative to scanning line curving in another scanning region.

The above-described arrangement of a plurality of scanning regions in the sub scanning direction may be realized, for instance, by arranging photoconductive photosensitive bodies as the scanning regions in the sub scanning direction so that the photosensitive bodies extend in the main scanning direction parallel to each other. Therefore, the optical scanner of the fourth embodiment may be used for a tandem-type imaging apparatus. The scanning regions arranged in the sub scanning direction may also be different optical scanning positions on the same photosensitive surface of a photosensitive body at which optical scanning positions different images are written to the photosensitive surface.

The above-described relative correction of the optical scanning positions in the sub scanning direction in the scanning regions is to adjust the relative positions of the scanning lines in the sub scanning direction in the scanning regions at the stage where the scanning line curving of each scanning line is corrected. This may be realized by controlling the formation of an exposure distribution. As previously described, however, the adjustment of the relative positions of the scanning lines in the sub scanning direction can be further facilitated by making the position of the scanning line adjustable in the sub scanning direction in at least one of the optical scanning parts by adjusting the modulation timing of the light source.

This adjustment is realized as follows. In the case of considering a rotary polygonal mirror having n deflecting and reflecting surfaces as the optical deflection and scanning part, when the rotary polygonal mirror is rotated so that each deflecting and reflecting surface deflects a light beam, n scanning lines can be formed by one rotation of the rotary polygonal mirror. For instance, in the case of n=6, one rotation of the rotary polygonal mirror can form six scanning lines.

Such a rotary polygonal mirror is employed, and its deflecting and reflecting surfaces are numbered 1 through 6 so that the odd-numbered deflecting and reflecting surfaces deflect a light beam. Thereby, three scanning lines are formed by every rotation of the rotary polygonal mirror. At this point, the modulation timing of the light beam is adjusted so that the even-numbered deflecting and reflecting surfaces deflect a light beam. Thereby, the positions of the scanning lines can be shifted by half of the scanning line pitch in the sub scanning direction from those of the scanning lines formed by the light beam deflected by the odd-numbered deflecting and reflecting surfaces.

Generally, in the case of deflecting a light beam by the first one of every N deflecting and reflecting surfaces, when the modulation timing of the light source is adjusted so that the light beam is deflected by the deflecting and reflecting surface next to the first one of every N deflecting and reflecting surfaces, the positions of the scanning lines can be shifted by one $N^{th}$ of the scanning line pitch in the sub scanning direction. Therefore, if N is suitably set to a large number, the scanning line position can be shifted finely in the sub scanning direction.

When N increases, however, the number of optical scans per rotation of the rotary polygonal mirror decreases, thus making it difficult to realize high-speed optical scanning. Generally, therefore, N is suitably set to two or three. In this case, the scanning ling position is adjusted by half or one third of the scanning line pitch, although this much of adjustment of the scanning line position is not necessarily sufficient. However, by combining this adjustment with the method employed by the optical scanner of the fourth embodiment, by which method an exposure distribution is formed to have a center of gravity between scanning lines adjacent in the sub scanning direction, and the position of the center of gravity in the sub scanning direction can be shifted, the position and the curve (including a tilt) of a scanning line can be corrected precisely.

The above description is given, with reference to FIGS. 2A and 2B, of the optical scanner according to the fourth embodiment of the present invention. The scanning line correction according to the fourth embodiment, however, may also be realized by the imaging apparatus of FIG. 11 according to the third embodiment of the present invention. The imaging apparatus of FIG. 11, to which the scanning line correction according to the fourth embodiment of the present invention is applied, includes the optical scanner according to the fourth embodiment for optically scanning the photoconductive photosensitive bodies 150Y, 150M, 150C, and 150K as the scanning regions. Electrostatic latent images are formed on the photosensitive bodies 150Y, 150M, 150C, and 150K by optical scanning to be made visible by the corresponding different color toners. The color toner images are transferred to the sheet-like recording medium P superimposed one over the other, thereby forming a composite color image.

Since the color toner images are transferred to the sheet-like recording medium P superimposed one over the other, the photosensitive bodies 150Y, 150M, 150C, and 150K substantially forming the scanning regions on which the electrostatic latent images are formed are arranged in the sub scanning direction. The formed composite image is, for instance, a two-color image or a multi-color image.

One of the toners for making visible the electrostatic latent images formed on the respective scanning regions may be a black toner, and the electrostatic latent image formed by forming the exposure distribution having the center of gravity between the scanning lines adjacent in the sub scanning direction may be made visible by any of the color toners other than the black toner.

In the case of forming a color image in a tandem-type imaging apparatus, normally, black, cyan, yellow, and magenta are used as the colors of the toner images forming the color image. In this case, in the quality of the color image, it is the black toner image that most requires resolution. This is because black is by far the most frequently used color for a character image requiring resolution.

When color other than black is used for a character image, it is less likely that only one color, for instance, cyan, is used, but in most cases, a plurality of color toners are superimposed. In this case, in order to improve resolution, it is of the greatest importance to reduce color misregistration.

In the case of forming an electrostatic latent image for the black toner image on the above-described scanning region where an exposure distribution is formed to have a center of gravity between scanning lines adjacent in the sub scanning direction, the actual resolution may be slightly lower than that required by the black toner image due to the correction of scanning lines. Accordingly, it is preferable that an electrostatic latent image made visible with a color toner other than a black toner be formed in the scanning region where the exposure distribution is formed.

Fifth Embodiment

Figure 15:
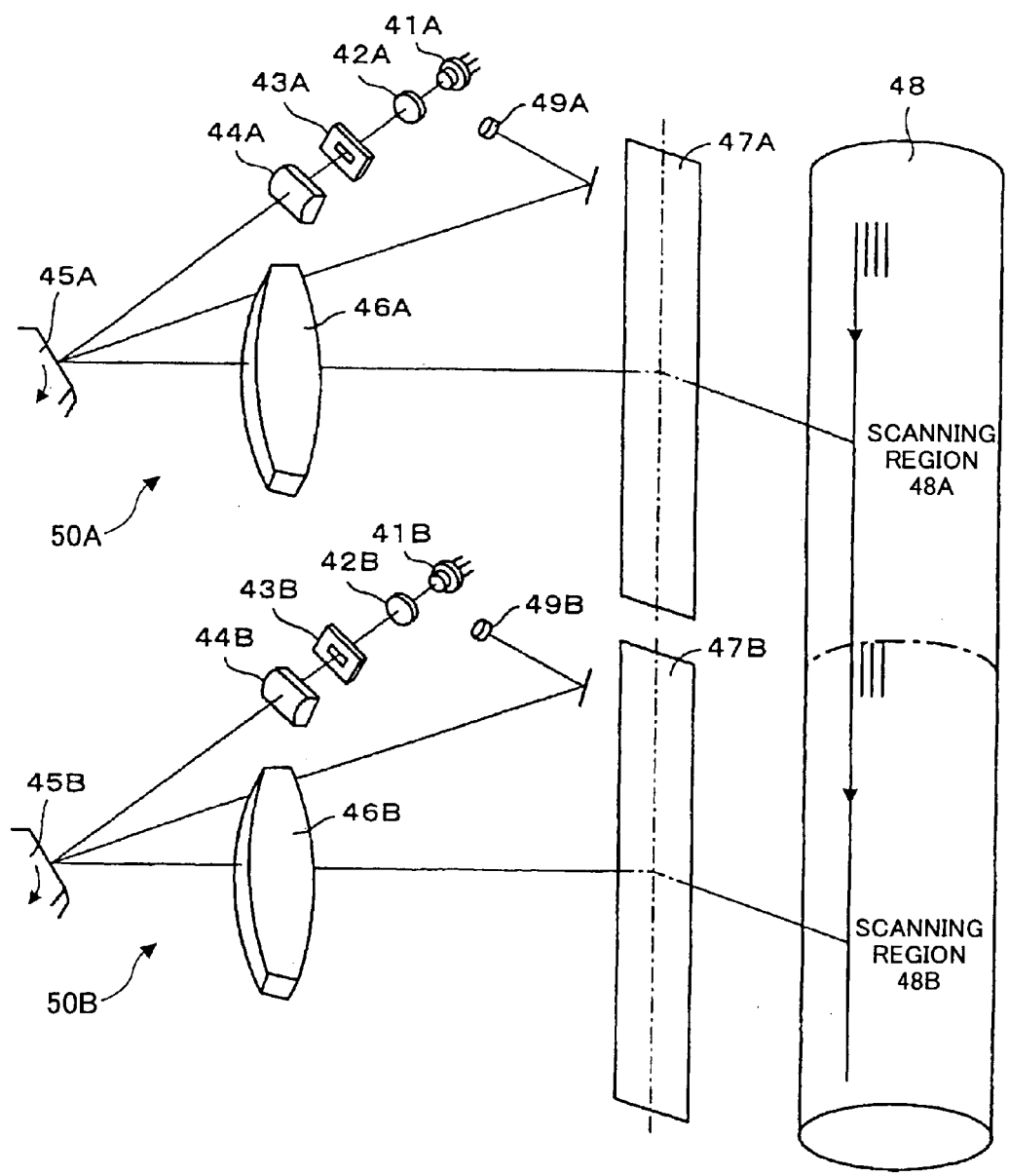
FIG. 15 is a diagram showing an optical scanner according to a fifth embodiment of the present invention.

FIG. 15 is a diagram showing an optical scanner according to a fifth embodiment of the present invention. The optical scanner of the fifth embodiment includes a photoconductive photosensitive body 48 forming a substantial scanning surface. The photosensitive body 48 is divided into two scanning regions 48A and 48B in the main scanning direction or in the direction of the axis of rotation. That is, the two scanning regions 48A and 48B are arranged in the main scanning direction. The scanning regions 48A and 48B are optically scanned by optical scanning parts 50A and 50B.

According to the optical scanner of FIG. 15, the optical scanning part 50A (50B) deflects a light beam emitted from a modulated light source 41A (41B) such as a semiconductor laser by an optical deflection and scanning part (polygon mirror) 45A (45B) so that the deflected light beam is guided by a scanning and imaging optical system 46A (46B) to be formed into a light spot on the scanning region 48A (48B). The scanning regions 48A and 48B of the scanning surface 48 are optically scanned by the respective light spots so that a plurality of images to form a desired image are written separately to the scanning regions 48A and 48B.

The optical scanning part 50A (50B) includes a coupling lens 42A (42B) coupling the light beam from the light source 41A (41B), an aperture 43A (43B) for beam shaping, a cylindrical lens 44A (44B), a mirror for optical path bending 47A (47B), and a photosensor 49A (49B).

In the optical scanning part 50A (50B), the light beam emitted from the light source 41A (41B) is coupled by the coupling lens 42A (42B) to be shaped by the aperture 43A (43B). Then, the light beam is focused by the cylindrical lens 44A (44B) on a deflecting and reflecting surface of the polygon mirror 45A (45B) as a line image extending in the main scanning direction. The light beam deflected by the polygon mirror 45A (45B) is focused into the light spot on the scanning region 48A (48B) by the action of the scanning and imaging optical system 46A (46B).

The optical paths of the light beams passing through the scanning and imaging optical systems 46A and 46B are bent by the mirrors 47A and 47B to be detected by the photosensors 49A and 49B, respectively. Synchronization is established between the optical scans based on the detection results.

In at least one of the scanning regions 48A and 48B, an exposure distribution may be formed to have a center of gravity between scanning lines adjacent in the sub scanning direction, and the position of the center of gravity in the sub scanning direction may be movable.

Figure 16A:
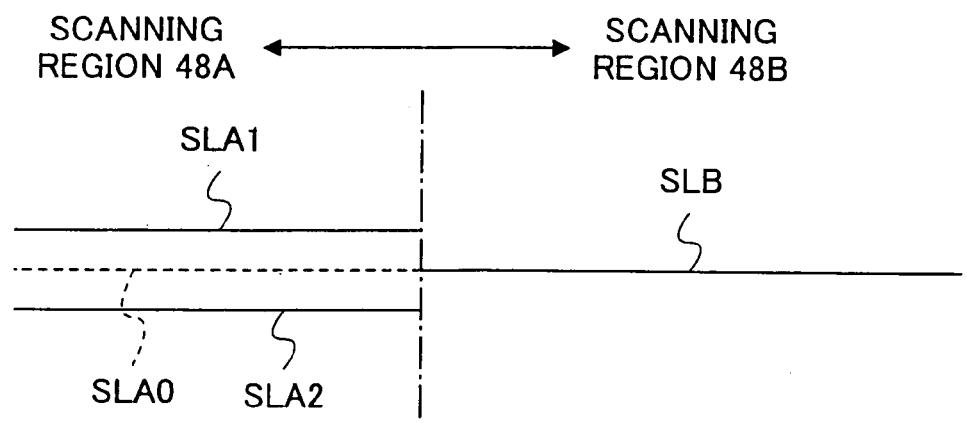
FIGS. 16A and 16B are diagrams for illustrating correction of a scanning line position according to the fifth embodiment of the present invention.

For instance, the optical scanning part 50A has the function of forming an exposure distribution having a center of gravity between scanning lines adjacent in the sub scanning direction in the scanning region 50A and varying the position of the center of gravity. In this case, when neither of scanning lines SLA1 and SLA2 in the scanning region 48A is aligned with the corresponding scanning line SLB in the scanning region 48B in the main scanning direction (or when there is a deviation in the sub scanning direction between the scanning line SLB and each of the scanning lines SLA1 and SLA2) as shown in FIG. 16A, an exposure distribution may be formed between the scanning lines SLA1 and SLA2 so that the scanning line SLA0 formed of the trace of the center of gravity of the exposure distribution is aligned with the scanning line SLB.

That is, in the scanning region 48A, which is at least one of the scanning regions, an exposure distribution is formed to have a center of gravity between the scanning lines SLA1 and SLA2 adjacent in the sub scanning direction. The position of the center of gravity in the sub scanning direction is shifted so that the optical scanning positions in the sub scanning direction in the scanning regions 48A and 48B may be corrected relative to each other.

According to the optical scanner of the fifth embodiment, the scanning regions are arranged in the main scanning direction. That is, all the region optically scanned to obtain a desired image is divided into the scanning regions in the main scanning direction, and the scanning regions are optically scanned by the respective different scanning parts. The desired image is formed by connecting the partial images written to the individual scanning regions in the main scanning direction. In this case, if there is a misalignment of scanning lines or a difference in the degree of scanning line curving between the scanning regions, the image quality is significantly degraded.

According to this optical scanner, the position of the center of gravity of the exposure distribution is adjustable in at least one of the scanning regions, so that the misalignment of scanning lines or the difference in the degree of scanning line curving between the one of the scanning regions and a scanning region adjacent thereto can be reduced effectively.

Further, scanning line curving in the scanning region 48A and scanning line curving in the scanning region 48B may also be corrected relative to each other. This is apparent from the above description based on FIGS. 12A through 14E.

In at least one of the optical scanning parts 50A and 50B of the optical scanner of FIG. 15, the scanning line position may be adjusted in the sub scanning direction by adjusting the modulation timing of the light source 41A or 41B. By combining the adjustment of the scanning line position by the adjustment of the modulation timing with the correction based on the shift of the center of gravity position of the exposure distribution, scanning line curving can be corrected more easily.

Figure 16B:
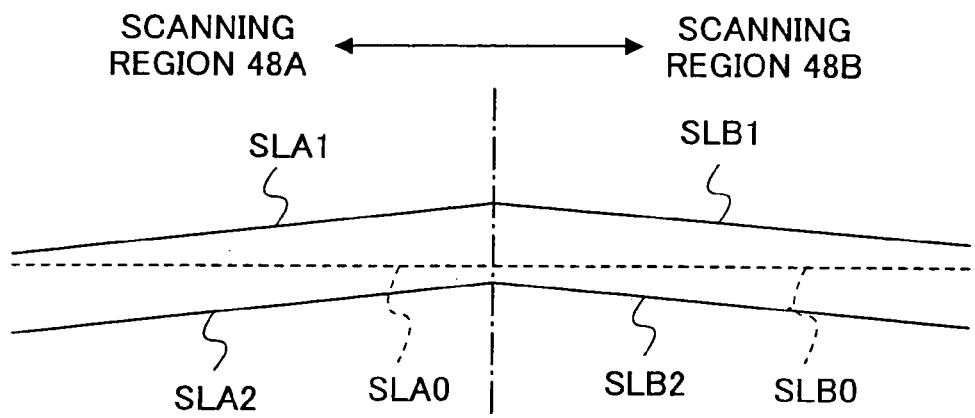

Alternatively, when the scanning lines SLA1 and SLA2 in the scanning region 48A are inclined differently from scanning lines SLB1 and SLB2 in the scanning region 48B as shown in FIG. 16B, the scanning line SLA0 and the corresponding scanning SLB0 may be formed in the scanning regions 48A and 48B, respectively, so as to be aligned with each other by performing correction based on the exposure distribution in each of the scanning regions 48A and 48B.

An imaging apparatus according to the fifth embodiment of the present invention includes the optical scanner of the fifth embodiment. According to the imaging apparatus of the fifth embodiment, each of the scanning regions 48A and 48B is a photoconductive photosensitive body, and the optical scanner optically scans the scanning regions 48A and 48B so that electrostatic latent images are formed on the scanning regions 48A and 48B. The electrostatic latent images are made visible with toner so as to be transferred compositely to a sheet-like recording medium, thereby forming a composite image.

The imaging apparatus may include a plurality of scanning surfaces arranged in the sub scanning direction, the scanning surfaces each including a plurality of scanning regions in the main scanning direction. Electrostatic latent images formed on the respective scanning surfaces may be made visible with different colors so that the visible color images are superimposed to form a multi-color image.

In the optical scanner of FIG. 15, the two scanning regions 48A and 48B are optically scanned by the two optical scanning parts 50A and 50B. However, the optical scanner may be configured so that three or more scanning regions may be optically scanned by as many optical scanning parts. When a plurality of scanning regions are thus provided in the main scanning direction so that the scanning regions are optically scanned independently by different optical scanning parts, a large-size image can be formed by increasing the size of the scanning surface in the main scanning direction.

Further, by increasing the number of optical scanning parts so as to reduce the size of each individual scanning region in the main scanning direction, the angle of view of each of the optical scanning parts optically scanning the individual scanning regions can be reduced. This makes it easier to improve the optical performance of the optical scanning parts, so that an excellent image can be formed.

In the case of dividing the scanning surface into a plurality of scanning regions and optically scanning the scanning regions independently of each other so that a composite image is formed by combining the images formed on the respective scanning regions, scanning line curving or scanning line tilting, which does not stand out in the individual image formed on each scanning region, stands out significantly in the composite image if there is a misalignment of scanning lines as shown in FIG. 16A or discontinuity in the inclination of scanning lines as shown in FIG. 16B, thereby greatly degrading the quality of the composite image. However, by correcting the position in the sub scanning direction, the tilt, or the curvature of a scanning line as described above, an excellent image can be obtained.

When the scanning regions 48A and 48B shown in FIG. 16A or 16B are defined as one unit, and the four same units are arranged in the sub scanning direction, a large-size composite color image can be obtained by making visible electrostatic latent images formed on the respective units (photosensitive bodies) with toners of different colors, transferring the visible images to a sheet-like recording-medium, and fixing the transferred images.

In the above-described fifth embodiment, the scanning regions are arranged in the main scanning direction. It is apparent, however, that the above-described scanning line correction is also applicable in the case of a single scanning region. That is, in the optical scanner of FIG. 15, the optical scanning part 50A and the scanning region 48A may be separated from the optical scanner to form a conventional optical scanner.

Such an optical scanner performing the above-described scanning line correction includes an optical scanning part in which a light beam emitted from a modulated light source is deflected by an optical deflection and scanning part so that the deflected light beam is guided by a scanning and imaging optical system to be formed into a light spot on a scanning surface, the light spot optically scanning the scanning surface so that a desired image is written to the scanning surface. In the scanning region, an exposure distribution is formed to have a center of gravity between scanning lines adjacent in the sub scanning direction so that the position of the center of gravity in the sub scanning direction can be shifted.

According to this optical scanner, when a dot line is formed in the scanning region so as to extend in the main scanning direction, the distance between one of the adjacent scanning lines and the center of gravity of the exposure distribution in the sub scanning direction may be varied according to the position in the main scanning direction. Further, the distance between the one of the adjacent scanning lines and the center of gravity of the exposure distribution in the sub scanning direction may be varied continuously according to the position in the main scanning direction. Furthermore, the position of the center of gravity of the exposure distribution for forming the dot line extending in the main scanning direction may be shifted over a plurality of scanning lines adjacent in the sub scanning direction.

This optical scanner may form an imaging apparatus. Such an imaging apparatus includes a photoconductive photosensitive body as the scanning region. The optical scanner optically scans the photosensitive body (scanning region) so that an electrostatic latent image is formed thereon. The electrostatic latent image is made visible with toner to be transferred to a sheet-like recording medium. Thereby, an image is formed on the sheet-like recording medium.

The above-described optical scanners and imaging apparatuses of the fourth and fifth embodiments may also employ the above-described method of correcting the constant velocity characteristic such as the fθ characteristic.

Thus, according to the optical scanners of the present invention, scanning line curving and a scanning position in the main scanning direction may be corrected and adjusted simply and easily, so that excellent optical scanning can be performed. The imaging apparatuses including the optical scanners of the present invention can form an excellent image.

Particularly, the optical scanner according to the fourth embodiment of the present invention can correct scanning line curving easily with certainty by forming an exposure distribution. A tandem-type color-image forming apparatus including this optical scanner can form an excellent image without color unevenness or color misregistration.

In the fourth and fifth embodiments, the two light spots forming an exposure distribution may be formed simultaneously as two light spots adjacent in the sub scanning direction. Alternatively, the two light spots may be formed at an interval by successive optical scans by the same light beam so as to be adjacent in the sub scanning direction.

This is because generally, the photosensitivity of a scanning surface is the scalar sum of exposures when the scanning surface is exposed to light (or optically scanned) a plurality of times.

Further, the multi-beam method as well as the single-beam method can be applied to the optical scanners and the imaging apparatuses of the fourth and fifth embodiments.

The present invention is not limited to the specifically disclosed embodiments, but variations and modifications may be made without departing from the scope of the present invention.

The present application is based on Japanese priority applications No. 2002-055517 filed on Mar. 1, 2002 and No. 2002-295220 filed on Oct. 8, 2002, the entire contents of which are hereby incorporated by reference.

What is claimed is:

1. An optical scanner comprising:
   a light source modulated based on image data to emit a plurality of light beams;
   an optical deflection and scanning part deflecting the light beams; and
   a scanning and imaging optical system condensing the deflected light beams toward a scanning surface so that light spots are formed on the scanning surface so as to be separated from each other in a sub scanning direction, the light spots having substantially equal scanning line curving characteristics and optically scanning the scanning surface simultaneously,
   wherein:
   an effective scanning region of the scanning surface is divided into a plurality of regions according to the scanning line curving characteristics; and
   a suitable one of the light beams is selected for optical scanning in each of the divided regions with respect to each of image lines every time the light spots optically scan the effective scanning region simultaneously.

2. An imaging apparatus comprising
   photoconductive photosensitive body; and
   the optical scanner of claim 1.

* * * * *